(12) United States Patent
Obara et al.

(10) Patent No.: US 10,116,370 B2
(45) Date of Patent: Oct. 30, 2018

(54) RADIO COMMUNICATION CONTROL METHOD AND RADIO COMMUNICATION SYSTEM

(71) Applicant: NTT DOCOMO, INC., Tokyo (JP)

(72) Inventors: Tatsunori Obara, Tokyo (JP); Satoshi Suyama, Tokyo (JP); Jiyun Shen, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/561,413

(22) PCT Filed: Mar. 23, 2016

(86) PCT No.: PCT/JP2016/059179
§ 371 (c)(1),
(2) Date: Sep. 25, 2017

(87) PCT Pub. No.: WO2016/152916
PCT Pub. Date: Sep. 29, 2016

(65) Prior Publication Data
US 2018/0109305 A1    Apr. 19, 2018

(30) Foreign Application Priority Data
Mar. 26, 2015    (JP) .................................. 2015-063557

(51) Int. Cl.
*H04B 15/00* (2006.01)
*H04B 7/06* (2006.01)
*H04B 7/08* (2006.01)

(52) U.S. Cl.
CPC ............. *H04B 7/0617* (2013.01); *H04B 7/08* (2013.01)

(58) Field of Classification Search
CPC .......... H04B 3/32; H04B 3/23; H04B 1/1036; H04L 25/03343; H04L 25/497;
(Continued)

(56) References Cited

U.S. PATENT DOCUMENTS 5,555,534 A * 9/1996 Maslak ............... G01S 15/8927
  367/135
5,909,460 A * 6/1999 Dent ........................ H01Q 3/26
  342/383

(Continued)

FOREIGN PATENT DOCUMENTS

JP    2013-232741 A    11/2013

OTHER PUBLICATIONS

International Search Report issued in PCT/JP2016/059179 dated Jun. 7, 2016 (1 page).

*Primary Examiner* — James M Perez
(74) *Attorney, Agent, or Firm* — Osha Liang LLP

(57) ABSTRACT

A number $L_R$ of receive beamforming circuits provided in a receive beamformer execute receive beamforming ($N_R/L_R$) times with respect to a received signal vector received by $N_R$ reception antennas $A_R$, thereby generating a receive beamforming (BF) output vector having $N_R$ receive BF output components. A calculation processor calculates a reception power for each of the $N_R$ receive BF output components, selects $L_R$ receive BF output components in decreasing order of reception power, and determines a suitable receive BF weight matrix including $L_R$ reception orthogonal BF weight vectors corresponding to the selected receive BF output components.

12 Claims, 11 Drawing Sheets

(58) Field of Classification Search
CPC ........... H04L 25/03057; H04L 27/368; H04L 25/03038; H04L 27/2647; H04L 2025/03414; H03F 1/3247; H03F 1/3294; H03F 2201/3233
USPC .......... 375/259–285, 295–296, 316–352
See application file for complete search history.

(56) References Cited

U.S. PATENT DOCUMENTS

| | | | | |
|---|---|---|---|---|
| 6,980,614 B2* | 12/2005 | Miller | G01S 19/21 | 375/346 |
| 7,496,147 B2* | 2/2009 | Baier | H04B 7/0413 | 375/220 |
| 7,515,655 B2* | 4/2009 | Uchida | H04B 7/086 | 375/260 |
| 7,526,039 B2* | 4/2009 | Kim | H04L 1/0618 | 375/259 |
| 7,539,259 B2* | 5/2009 | Dias | H04B 7/04 | 375/260 |
| 7,580,490 B2* | 8/2009 | Suh | H04L 25/0228 | 375/260 |
| 7,688,910 B2* | 3/2010 | Takano | H04B 7/0854 | 375/260 |
| 7,826,551 B2* | 11/2010 | Lee | H04L 25/0272 | 327/64 |
| 7,924,943 B2* | 4/2011 | Kim | H04L 1/0003 | 375/219 |
| 8,000,418 B2* | 8/2011 | Jin | H01Q 3/2617 | 342/368 |
| 8,000,421 B2* | 8/2011 | Takano | H04B 7/02 | 375/349 |
| 8,023,554 B2* | 9/2011 | Kent | H04B 1/7115 | 375/144 |
| 8,032,107 B1* | 10/2011 | Beard | H04W 52/0229 | 455/343.3 |
| 8,059,709 B2* | 11/2011 | Abou Rjeily | H04B 1/7163 | 375/239 |
| 8,059,710 B2* | 11/2011 | Abou Rjeily | H04L 1/0625 | 375/131 |
| 8,098,776 B2* | 1/2012 | Kent | H04B 7/0697 | 375/141 |
| 8,111,789 B2* | 2/2012 | Kent | H04L 25/0204 | 342/377 |
| 8,165,194 B2* | 4/2012 | Abou Rjeily | H04L 1/0643 | 375/239 |
| 8,229,017 B1* | 7/2012 | Lee | H04B 7/0665 | 342/432 |
| 8,238,488 B1* | 8/2012 | Lee | H04L 25/03331 | 375/262 |
| 8,325,844 B2* | 12/2012 | Walton | H04B 7/0417 | 375/130 |
| 8,340,214 B2* | 12/2012 | Kang | H04L 25/03343 | 375/232 |
| 8,351,555 B2* | 1/2013 | Semenov | H04B 17/336 | 375/285 |
| 8,391,429 B2* | 3/2013 | Mergen | H04B 7/0452 | 375/148 |
| 8,417,191 B2* | 4/2013 | Xia | H04B 7/0617 | 342/368 |
| 8,442,139 B2* | 5/2013 | Lee | H04B 7/0639 | 375/267 |
| 8,451,932 B2* | 5/2013 | Onggosanusi | H04B 7/0426 | 375/260 |
| 8,451,944 B2* | 5/2013 | Gaur | H04B 7/0426 | 375/296 |
| 8,457,240 B2* | 6/2013 | Lee | H04B 7/0417 | 375/285 |
| 8,457,265 B2* | 6/2013 | Sampath | H04L 25/03006 | 375/232 |
| 8,537,928 B2* | 9/2013 | Khojastepour | H04B 7/0684 | 375/144 |
| 8,548,088 B2* | 10/2013 | Lee, II | H04L 25/03343 | 375/260 |
| 8,559,552 B2* | 10/2013 | Wang | H04L 1/04 | 375/264 |
| 8,619,886 B2* | 12/2013 | Nsenga | H04B 7/0617 | 375/260 |
| 8,675,794 B1* | 3/2014 | Perets | H04L 1/0003 | 375/225 |
| 8,699,607 B2* | 4/2014 | Seller | H04L 27/2649 | 375/256 |
| 8,737,494 B2* | 5/2014 | Kim | H04B 7/0417 | 370/338 |
| 8,774,310 B2* | 7/2014 | Khan | H04L 5/0023 | 375/133 |
| 8,792,573 B2* | 7/2014 | Kim | H04B 7/0404 | 375/261 |
| 8,798,117 B1* | 8/2014 | Campbell | H04B 7/0814 | 375/148 |
| 8,861,637 B2* | 10/2014 | Na | H04L 25/03343 | 375/232 |
| 8,917,796 B1* | 12/2014 | Mayrench | H04L 5/0028 | 375/260 |
| 8,948,293 B2* | 2/2015 | Onggosanusi | H04B 7/024 | 375/284 |
| 9,001,918 B2* | 4/2015 | Taori | H04L 27/2626 | 375/137 |
| 9,031,097 B2* | 5/2015 | Walton | H04B 7/0417 | 370/535 |
| 9,048,894 B2* | 6/2015 | Wang | H04B 7/043 | |
| 9,124,313 B2* | 9/2015 | Ko | H04B 7/024 | |
| 9,191,080 B2* | 11/2015 | Yokomakura | H04L 1/0071 | |
| 9,191,194 B2* | 11/2015 | Robertson | H04L 7/04 | |
| 9,246,571 B2* | 1/2016 | Wang | H04B 7/043 | |
| 9,288,007 B2* | 3/2016 | Jover | H04K 3/224 | |
| 9,318,794 B2* | 4/2016 | Chang | H01Q 1/243 | |
| 9,319,079 B2* | 4/2016 | Eda | H04B 17/00 | |
| 9,344,168 B2* | 5/2016 | Abreu | H04B 7/0456 | |
| 9,356,669 B2* | 5/2016 | Gao | H04B 7/0469 | |
| 9,369,309 B2* | 6/2016 | Seyama | H04L 25/0202 | |
| 9,374,141 B2* | 6/2016 | Murakami | H04B 7/04 | |
| 9,401,826 B2* | 7/2016 | Eitel | H04L 25/0238 | |
| 9,479,381 B2* | 10/2016 | Siohan | H04L 1/0668 | |
| 9,484,995 B2* | 11/2016 | Gao | H04B 7/0456 | |
| 9,515,372 B2* | 12/2016 | Chang | H01Q 1/1257 | |
| 9,571,322 B2* | 2/2017 | Bae | H04L 27/2627 | |
| 9,596,017 B1* | 3/2017 | Mayrench | H04L 5/0028 | |
| 9,596,120 B2* | 3/2017 | Yamanouchi | H03F 3/24 | |
| 9,621,233 B2* | 4/2017 | Lee | H04B 7/024 | |
| 9,647,736 B1* | 5/2017 | Schelstraete | H04B 7/0456 | |
| 9,647,737 B2* | 5/2017 | Obara | H04B 7/0456 | |
| 9,699,664 B2* | 7/2017 | Jover | H04W 16/28 | |
| 9,813,276 B2* | 11/2017 | Jungnickel | H04L 25/03828 | |
| 9,819,407 B2* | 11/2017 | Kim | H04B 7/046 | |
| 9,876,657 B1* | 1/2018 | Jeon | H04L 25/03159 | |
| 9,906,285 B2* | 2/2018 | Ling | H04B 7/0617 | |
| 2003/0218973 A1* | 11/2003 | Oprea | H04B 7/0434 | 370/210 |
| 2004/0156443 A1* | 8/2004 | Dent | H04B 7/0408 | 375/267 |
| 2004/0190636 A1* | 9/2004 | Oprea | H04B 7/0417 | 375/260 |
| 2004/0192218 A1* | 9/2004 | Oprea | H04L 25/03343 | 455/73 |
| 2007/0104288 A1* | 5/2007 | Kim | H04B 7/0417 | 375/267 |
| 2008/0019457 A1* | 1/2008 | Waters | H01Q 3/2605 | 375/267 |
| 2009/0067525 A1* | 3/2009 | Kim | H04B 7/0617 | 375/260 |
| 2011/0069778 A1* | 3/2011 | Kim | H04L 1/0003 | 375/285 |
| 2012/0033761 A1* | 2/2012 | Guo | G01S 3/023 | 375/316 |
| 2012/0307926 A1* | 12/2012 | Kuo | H04B 7/024 | 375/267 |
| 2013/0039445 A1* | 2/2013 | Hwang | H04B 7/0617 | 375/316 |

(56) References Cited

U.S. PATENT DOCUMENTS

| | | | | |
|---|---|---|---|---|
| 2013/0040682 A1* | 2/2013 | Chang | H01Q 1/243 | 455/517 |
| 2013/0065622 A1* | 3/2013 | Hwang | H04W 16/28 | 455/500 |
| 2013/0114500 A1* | 5/2013 | Liu | H04B 7/024 | 370/315 |
| 2014/0056381 A1* | 2/2014 | Wang | H04B 7/0617 | 375/295 |
| 2014/0073337 A1* | 3/2014 | Hong | H04W 16/28 | 455/452.1 |
| 2014/0098912 A1* | 4/2014 | Yin | H04B 7/0417 | 375/345 |
| 2014/0146863 A1* | 5/2014 | Seol | H04B 7/0456 | 375/224 |
| 2014/0321563 A1* | 10/2014 | Park | H04L 25/03898 | 375/260 |
| 2014/0334566 A1* | 11/2014 | Kim | H04B 7/0469 | 375/267 |
| 2014/0355707 A1* | 12/2014 | Kim | H04B 7/0469 | 375/267 |
| 2015/0085838 A1* | 3/2015 | Benjebbour | H04W 16/28 | 370/336 |
| 2015/0156786 A1* | 6/2015 | Kim | H04B 7/0452 | 370/329 |
| 2015/0236774 A1* | 8/2015 | Son | H04B 7/0628 | 375/267 |
| 2015/0288439 A1* | 10/2015 | Kim | H04B 7/0469 | 375/295 |
| 2016/0080051 A1* | 3/2016 | Sajadieh | H04B 7/0456 | 375/267 |
| 2016/0353294 A1* | 12/2016 | Wang | H04B 7/0456 | |
| 2016/0359533 A1* | 12/2016 | Obara | H04B 7/0408 | |
| 2017/0026938 A1* | 1/2017 | Onggosanusi | H04B 7/0626 | |
| 2017/0134083 A1* | 5/2017 | Kim | H04B 7/0617 | |
| 2017/0163326 A1* | 6/2017 | Kim | H04B 7/0617 | |
| 2017/0294943 A1* | 10/2017 | Shen | H04B 7/0413 | |
| 2018/0048363 A1* | 2/2018 | Okuyama | H04B 7/0452 | |
| 2018/0109305 A1* | 4/2018 | Obara | H04B 7/0617 | |

* cited by examiner

RADIO COMMUNICATION CONTROL METHOD AND RADIO COMMUNICATION SYSTEM

TECHNICAL FIELD

The present invention pertains to a radio communication control method and a radio communication system.

BACKGROUND ART

In the field of radio communication, there has been actively employed in recent years a MIMO (Multiple-Input and Multiple-Output) transmission scheme, which enables increased speed and improved quality of signal transmission by carrying out transmission/reception on both a transmitter side and a receiver side using a plurality of antennas.

Further, there is known in the art (for example, Patent Document 1) a massive-MIMO transmission scheme in which there is used a large number of antenna elements so as to achieve a further increase in speed and a reduction in interference in signal transmission, (for example, 100 elements or more) in a high-frequency band (for example 10 GHz or more), and use of which also enables miniaturization of antennas and a wide bandwidth to be attained.

With massive-MIMO, there can be achieved advanced beamforming (BF) by use of a large number of antenna elements, compared to conventional MIMOs. Beamforming is a technique of controlling the directivity and shape of beams (where transmission beams correspond to transmission antennas, and reception beams correspond to reception antennas) by use of a plurality of antenna elements. With MIMO, phase and amplitude can be controlled for each antenna element, thus the larger the number of antenna elements used, the greater the freedom of beam control.

Mathematically, beamforming applied to transmission signals is represented as a multiplication of a vector indicating a transmission signal by a beamforming weight matrix (hereafter, sometimes referred to as BF weight matrix). A BF weight matrix is represented as a matrix that includes a plurality of beamforming weight vectors (hereafter, sometimes referred to as BF weight vectors) as a component. Furthermore, it is noted that hereafter BF weight matrices and BF weight vectors are sometimes collectively referred to as "BF weight".

As one mode of beamforming, fixed beamforming is exemplified. In fixed beamforming, a beamforming weight (fixed beam) for use is selected from among a plurality of beamforming weights prepared in advance. In fixed beamforming, beamforming that controls fixed beams and coding that achieves compensation for multiplexing between a plurality of streams (transmission-side precoding and reception-side postcoding) are carried out separately.

RELATED ART DOCUMENT

Patent Document

Patent Document 1 Japanese Patent Application Laid-Open Publication No. 2013-232741

SUMMARY OF THE INVENTION

Problem to be Solved by the Invention

To suitably carry out MIMO transmission, suitable execution of beamforming, that is, determination of a suitable BF weight is of importance. To determine a BF weight, a large amount of computing, such as use of each of candidate BF weights to carry out channel estimation using round-robin scheduling, and comparing the channel estimation results to select an optimum BF weight is assumed.

However, if calculation is carried out on all combination patterns, the computing load becomes excessive. In particular, a large number of antenna elements are adopted in massive-MIMO transmission schemes, making the problem of increased processing load more significant.

In consideration of the above-stated matters, the purpose of the present invention is to determine a suitable BF weight while reducing computational complexity, thereby achieving suitable MIMO transmission.

Means for Solving the Problem

A radio communication control method in a radio communication system of the present invention comprises a transmitter device provided with a precoder configured to carry out precoding by using a precoding matrix, a transmit beamformer configured to carry out transmit beamforming, in which variation in phase and amplitude corresponding to a transmit beamforming (BF) weight matrix is imparted to signals after precoding has been executed, and a number $N_T$ of transmission antennas for transmitting the signals subjected to the transmit beamforming; and a receiver device provided with a number $N_R$ of reception antennas for receiving signals that have been transmitted from the transmitter device and propagated through a space, a receive beamformer configured to carry out receive beamforming, in which variation in phase and amplitude corresponding to a receive BF weight matrix is imparted to the signals received by the plurality of reception antennas, and a postcodes configured to carry out, by using a postcoding matrix, postcoding on the signals that have been subjected to the analog receive beamforming, the method comprising: generating a receive BF output vector having a number $N_R$ of receive BF output components, by a number $L_R$ of receive beamforming circuits provided in the receive beamformer carrying out receive beamforming ($N_R/L_R$) times with respect to a received signal vector received by the number $N_R$ of the reception antennas; calculating reception power for each of the $N_R$ receive BF output components; and selecting the $L_R$ receive BF output components in decreasing order of reception power, and determining a suitable receive BF weight matrix including $L_R$ reception orthogonal BF weight vectors corresponding to the selected receive BF output components.

Another radio communication control method in a radio communication system of the present invention comprises a transmitter device provided with a precoder configured to carry out precoding by using a precoding matrix, a transmit beamformer configured to carry out transmit beamforming, in which variation in phase and amplitude corresponding to a transmit beamforming (BF) weight matrix is imparted to signals after precoding has been executed, and a number $N_T$ of transmission antennas for transmitting the signals that have been subjected to the transmit beamforming; and a receiver device provided with a number $N_R$ of reception antennas for receiving signals that have been transmitted from the transmitter device and propagated through a space, a receive beamformer configured to carry out receive beamforming, in which variation in phase and amplitude corresponding to a receive BF weight matrix is imparted to the signals received by the plurality of reception antennas, and a postcoder configured to carry out, by using a postcoding matrix, postcoding on the signals that have been subjected to the analog receive beamforming, the method comprising: generating a receive BF output vector having a number $N_R$ of receive BF output components, by a number $L_R$ of receive beamforming circuits provided in the receive beamformer carrying out receive beamforming ($N_R/L_R$) times with respect to a received signal vector received by the number $N_R$ of the reception antennas; acquiring the received signal vector by multiplying each of a number $N_R$ of separation operators corresponding to the $N_R$ reception antennas with respect to the receive BF output vector; estimating a channel matrix using the received signal vector; calculating reception power for each of a plurality of receive BF weight vector candidates using the estimated channel matrix; and selecting the $L_R$ receive BF weight vector candidates in decreasing order of reception power, and determining a suitable receive BF weight matrix including the selected $L_R$ receive BF weight vector candidates.

Another radio communication control method in a radio communication system of the present invention comprises a transmitter device provided with a precoder configured to carry out precoding by using a precoding matrix, a transmit beamformer configured to carry out transmit beamforming, in which variation in phase and amplitude corresponding to a transmit beamforming (BF) weight matrix is imparted to signals after precoding has been executed, and a number $N_T$ of transmission antennas for transmitting the signals that have been subjected to the transmit beamforming; and a receiver device provided with a number $N_R$ of reception antennas for receiving signals that have been transmitted from the transmitter device and propagated through a space, a receive beamformer configured to carry out receive beamforming, in which variation in phase and amplitude corresponding to a receive BF weight matrix is imparted to the signals received by the plurality of reception antennas, and a postcoder configured to carry out, by using a postcoding matrix, postcoding on the signals that have been subjected to the analog receive beamforming, the method comprising: acquiring a received signal vector, by each of a number $L_R$ of receive beamforming circuits provided in the receive beamformer carrying out a bypass receiving operation that selects and acquires one of the received signal vector elements ($N_R/L_R$) times with respect to the received signal vector received by the number $N_R$ of the reception antennas; estimating a channel matrix using the received signal vector; calculating reception power for each of a plurality of receive BF weight vector candidates using the estimated channel matrix; and selecting the $L_R$ receive BF weight vector candidates in decreasing order of reception power, and determining a suitable receive BF weight matrix including the selected $L_R$ receive BF weight vector candidates.

A radio communication system of the present invention comprises a transmitter device provided with a precoder configured to carry out precoding by using a precoding matrix, a transmit beamformer configured to carry out transmit beamforming, in which variation in phase and amplitude corresponding to a transmit beamforming (BF) weight matrix is imparted to signals after precoding has been executed, and a number $N_T$ of transmission antennas for transmitting the signals that have been subjected to the transmit beamforming; and a receiver device provided with a number $N_R$ of reception antennas for receiving signals that have been transmitted from the transmitter device and propagated through a space, a receive beamformer configured to carry out receive beamforming, in which variation in phase and amplitude corresponding to a receive BF weight matrix is imparted to the signals received by the plurality of reception antennas, and a postcoder configured to carry out, by using a postcoding matrix, postcoding on the signals that have been subjected to the analog receive beamforming, wherein, the receive beamformer generates a receive BF output vector having a number $N_R$ of receive BF output components, by a number $L_R$ of receive beamforming circuits provided in the receive beamformer carrying out receive beamforming ($N_R/L_R$) times with respect to a received signal vector received by the number $N_R$ of the reception antennas, and the receiver device is further provided with a calculation processor configured to calculate reception power for each of the $N_R$ receive BF output components, and select the $L_R$ receive BF output components in decreasing order of reception power, and determine a suitable receive BF weight matrix including $L_R$ reception orthogonal BF weight vectors corresponding to the selected receive BF output components.

Another radio communication system of the present invention comprises a transmitter device provided with a precoder configured to carry out precoding by using a precoding matrix, a transmit beamformer configured to carry out transmit beamforming, in which variation in phase and amplitude corresponding to a transmit BF weight matrix is imparted to signals after precoding has been executed, and a number $N_T$ of transmission antennas for transmitting the signals that have been subjected to the transmit beamforming, and a receiver device provided with a number $N_R$ of reception antennas for receiving signals that have been transmitted from the transmitter device and propagated through a space, a receive beamformer configured to carry out receive beamforming, in which variation in phase and amplitude corresponding to a receive BF weight matrix is imparted to the signals received by the plurality of reception antennas, and a postcoder configured to carry out, by using a postcoding matrix, postcoding on the signals that have been subjected to the analog receive beamforming, wherein, the receive beamformer generates a receive BF output vector having a number $N_R$ of receive BF output components, by a number $L_R$ of receive beamforming circuits provided in the receive beamformer carrying out receive beamforming ($N_R/L_R$) times with respect to a received signal vector received by the number $N_R$ of the reception antennas, the receiver device is further provided with a calculation processor configured to acquire the received signal vector by multiplying each of a number $N_R$ of separation operators corresponding to the $N_R$ reception antennas with respect to the receive BF output vector, estimate a channel matrix using the received signal vector, calculate reception power for each of a plurality of receive BF weight vector candidates using the estimated channel matrix, and select the $L_R$ receive BF weight vector candidates in decreasing order of reception power, and determine a suitable receive BF weight matrix including the selected $L_R$ receive BF weight vector candidates.

Another radio communication system of the present invention comprises a transmitter device provided with a precoder configured to carry out precoding by using a precoding matrix, a transmit beamformer configured to carry out transmit beamforming, in which variation in phase and amplitude corresponding to a transmit BF weight matrix is imparted to signals after precoding has been executed, and a number $N_T$ of transmission antennas for transmitting the signals that have been subjected to the transmit beamforming, and a receiver device provided with a number $N_R$ of reception antennas for receiving signals that have been transmitted from the transmitter device and propagated through a space, a receive beamformer configured to carry out receive beamforming, in which variation in phase and amplitude corresponding to a receive BF weight matrix is imparted to the signals received by the plurality of reception antennas, and a postcoder configured to carry out, by using a postcoding matrix, postcoding on the signals that have been subjected to the analog receive beamforming, wherein, each of a number $L_R$ of receive beamforming circuits provided in the receive beamformer carries out a bypass receiving operation that selects and acquires one of the received signal vector elements ($N_R/L_R$) times with respect to a received signal vector received by the number $N_R$ of the reception antennas, to acquire the received signal vector, the receiver device is further provided with a calculation processor configured to estimate a channel matrix using the received signal vector, calculate reception power for each of a plurality of receive BF weight vector candidates using the estimated channel matrix, and select the $L_R$ receive BF weight vector candidates in decreasing order of reception power, and determine a suitable receive BF weight matrix including the selected $L_R$ receive BF weight vector candidates.

Effect of the Invention

According to the present invention, a weight matrix is determined in stages. Accordingly, the number of combinations to be calculated are reduced compared to a configuration wherein all combinations of weight matrices are tested to determine a weight matrix. As a result, an amount of calculation required to determine a weight matrix is reduced, while a suitable BF weight matrix is determined.

MODES FOR CARRYING OUT THE INVENTION

1. First Embodiment

1(1) Massive-MIMO Transmission

Following is an explanation of the massive-MIMO transmission scheme according to the first embodiment of the present invention. In this massive-MIMO transmission scheme, a base station executes radio communication by using a plurality of transmission antennas $A_T$, and multiplexing is performed to achieve a high radio communication speed (data rate). Further, since freedom of antenna control is increased when executing beamforming, advanced beamforming is achieved as compared to the conventional art. Accordingly, interference reduction and effective use of radio resources are achieved. The number of transmission antennas $A_T$ provided at a base station adapted for massive-MIMO is preferably 32 or more, 64 or more, 96 or more, 100 or more, 128 or more, 192 or more, 200 or more, 256 or more, 500 or more, 512 or more, 1000 or more or 1024 or more, but is not limited thereto.

A high-frequency band (for example, a frequency band of 10 GHz or higher) is preferably used in a massive-MIMO transmission scheme. Use of a high-frequency band enables a wide bandwidth to be secured (for example, 200 MHz or more) for radio resources, in contrast to use of a low-frequency band. Since the size of an antenna element is proportional to a wavelength of a signal, it is possible to further miniaturize antennas when using a high-frequency band in which the wavelengths of radio signals are relatively short. On the other hand, the higher a frequency is, the greater an increase in propagation loss is. Thus, even when, for example, radio signals are transmitted from a base station with the same transmission power, use of a high-frequency band results in a drop in reception signal strength at a mobile station as compared to when a low-frequency band is used.

Figure 1:
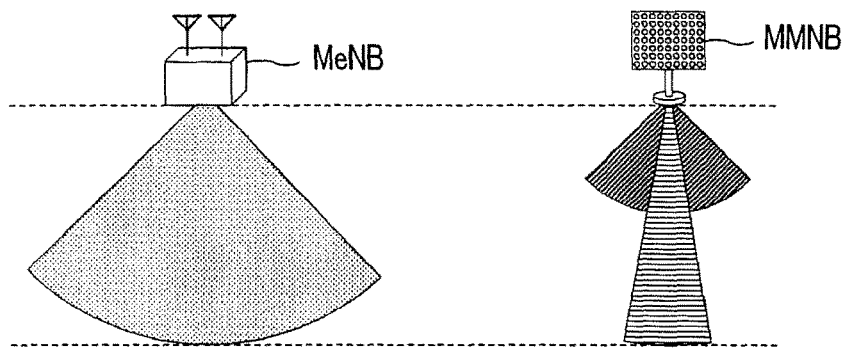
FIG. 1 is a drawing explaining an outline of a massive-MIMO transmission scheme as in a first embodiment.

A drop in reception signal strength due to use of a high-frequency band described above can be compensated for by employing beamforming gain. FIG. 1 is a schematic drawing indicating a reachable range of a beam (radio signal) according to a frequency. Conventional base stations (macro base stations MeNB) perform radio communication by using low-frequency bands, thus the beams reach further even when beams with wide radiation patterns are used. Meanwhile, the base station (small base station MMNB) compatible with the massive-MIMO transmission scheme of the present embodiment performs radio communication by using a high-frequency band, resulting in a short beam reaching distance compared to a macro base station MeNB when a beam having a wide radiation pattern is used. However, when the width of a beam radiation pattern is reduced by means of beamforming, it is possible to increase a distance reached by a beam even in the case of a small base station MMNB in which a high-frequency band is used.

Figure 2:
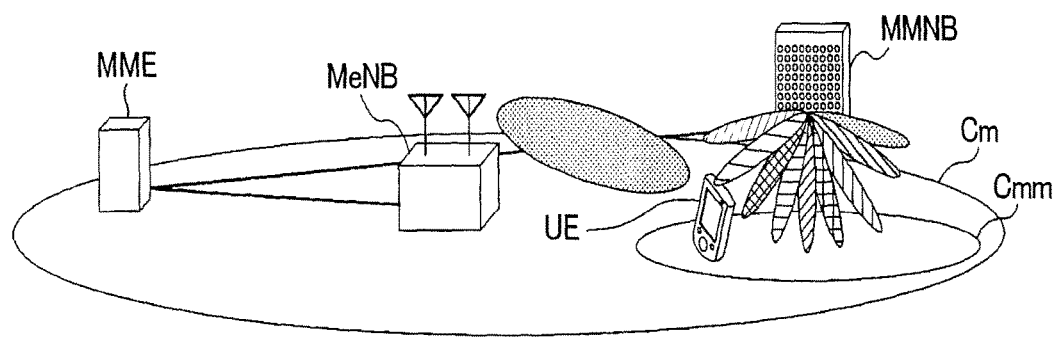
FIG. 2 is a schematic configuration diagram of a radio communication system as in the first embodiment.

FIG. 2 is a schematic block diagram of a radio communication system 1 according to the first embodiment. Radio communication system 1 comprises a macro base station MeNB, a small base station MMNB, a central control station MME, and a user equipment UE. The small base station MMNB is compatible with the massive-MIMO transmission scheme.

The macro base station MeNB has macro cells Cm formed on the surroundings thereof, and the small base station MMNB has massive-MIMO cells (MM cell) Cmm formed on the surroundings thereof. The frequency band (for example, a 10 GHz band) used in the small base station MMNB has a higher frequency and greater propagation loss compared to a frequency band (for example, a 2 GHz band) used in the macro base station MeNB, thus the cell size of MM cell Cmm is smaller than the cell size of Macro cell Cm. Accordingly, the small base station MMNB and user equipment UE are likely to be connected via line-of-sight.

As indicated in FIG. 2, it is possible for MM cell Cmm to overlap with an area in which radio communication can be achieved by using another radio access technology (RAT) such as macro cell Cm. As a result, with respect to user equipment UE positioned in an overlapping region, support exists for multiple connectivity under a plurality of radio access technologies. Further, a control signal can be transmitted, from a macro base station MeNB that is compatible with the different radio access technology, to a user equipment UE that is currently in communication with small base station MMNB compatible with the massive-MIMO transmission scheme. Another example of radio access technology that can be cited is a public or local wireless LAN.

As such, in a massive-MIMO transmission in which a high-frequency bandwidth is used, it is preferable to compensate for propagation loss by way of a gain achieved by beamforming. To achieve radio communication at a high speed, preferably a plurality of data streams are spatially multiplexed and transmitted. In such a multiplex transmission, it is preferable not only for a beam to be controlled by beamforming, but also for inter-stream multiplexing to be compensated for by use of precoding.

Figure 3:
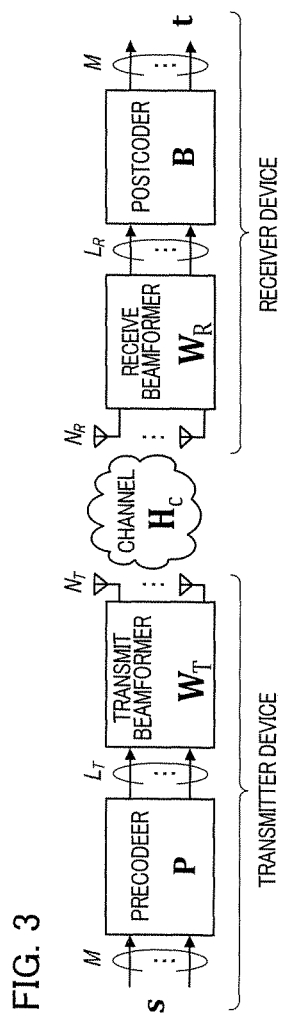
FIG. 3 is a drawing illustrating a functional configuration of the massive-MIMO transmission as in the first embodiment.

More specifically, as outlined in FIG. 3, it is preferable for the precoder and transmission beam former of a transmitter device (for example, small base station MMNB) to respectively execute precoding and transmit beamforming, and for the reception beam former and postcoder of a receiver device (for example, user equipment UE) to respectively execute receive beamforming and postcoding.

Mathematically, a precoding process is a process in which an M-by-1 signal vector S representing M (M is an integer of 2 or higher; M=16, for example) streams is multiplied by (an) $L_T$-by-M ($L_T$ is the number of transmission beams) precoding matrix P. A transmit beamforming process is a process in which a signal that has been subjected to precoding is multiplied by an $N_T$-by-$L_T$ ($N_T$ is the number of transmission antennas; $N_T$=256, for example) transmit BF (beamforming) weight matrix $W_T$. After transmit beamforming, a signal transmitted from a transmission antenna $A_T$ is multiplied by an $N_R$-by-$N_T$ ($N_R$ is the number of reception antennas; $N_R$=16, for example) channel characteristic matrix $H_c$ corresponding to the spatial propagation. A receive beamforming process is a process in which a signal received by a reception antenna $A_R$ is multiplied by an $L_R$-by-$N_R$ ($L_R$ is the number of reception beams) receive BF weight matrix $W_R$. A postcoding process is a process in which a signal that has been subjected to receive beamforming is multiplied by an M-by-$L_R$ postcoding matrix B. In light of the above-stated matter, an M-by-1 signal vector t after postcoding is expressed by the following Mathematical Expression.

$$t = BW_R HW_T Ps + z \quad (1),$$

where the additional z included in the above-stated Numerical Formula (1) is an M-by-1 noise vector.

Figure 4:
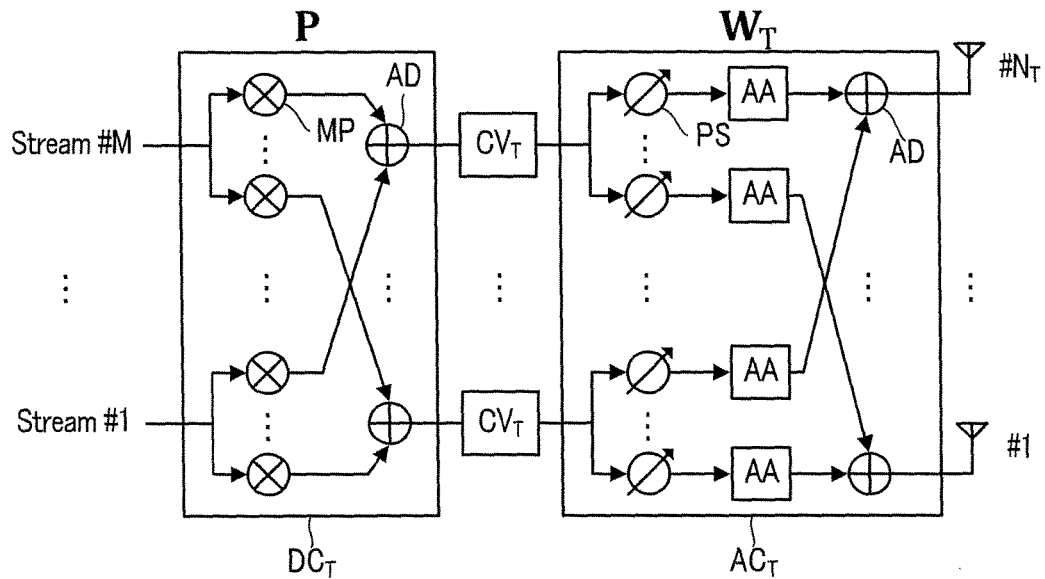
FIG. 4 is a drawing illustrating a circuit configuration of a transmitter device as in the first embodiment.
Figure 5:
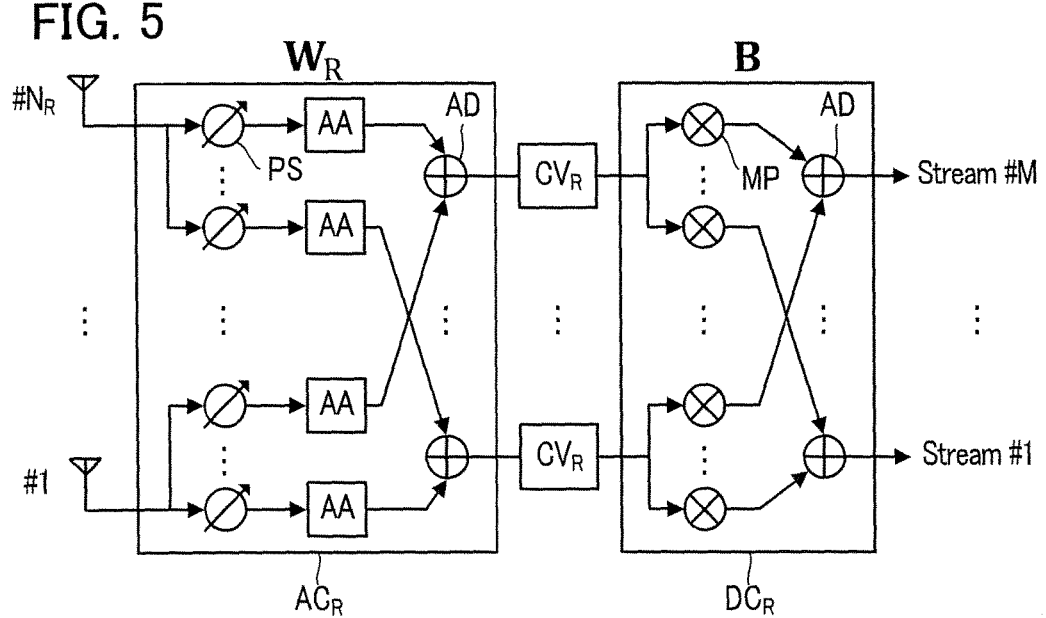
FIG. 5 is a drawing illustrating a circuit configuration of a receiver device as in the first embodiment.

As a more suitable mode for massive-MIMO transmission in the present embodiment, digital precoding is adopted as the precoding, while analog fixed beamforming is adopted as the transmission and receive beamforming, and digital postcoding is adopted as the postcoding. Each of FIGS. 4 and 5 illustrates, in a non-limiting manner, an example of a specific circuit configuration. FIG. 4 illustrates a transmitter-side equalizing circuit, and FIG. 5 illustrates a receiver-side equalizing circuit.

As illustrated in FIG. 4, on the transmitter side, M streams are subjected to digital precoding (matrix calculation) by use of a digital signal processor $DC_T$ having a plurality of multipliers MP and adders AD, and subsequently, a processing circuit $PC_T$ carries out an inverse Fourier transformation, insertion of a guard interval, digital-to-analog conversion, and up-conversion, thereby generating a high-frequency transmission signal. The high-frequency transmission signal is subjected to phase and amplitude modification by an analog signal processor $AC_T$ having a plurality of variable phase shifters PS and/or amplitude adjusters AA, and adders AD (in other words, is subjected to analog transmit beamforming), and is subsequently transmitted from $N_T$ transmission antennas $A_T$.

As illustrated in FIG. 5, on the receiver side, a high-frequency reception signal received by $N_R$ reception antennas $A_R$ is subjected to phase and amplitude modification by an analog signal processor $AC_R$ having a plurality of variable phase shifters PS, amplitude adjusters AA, and adders AD (in other words, is subjected to analog receive beamforming). Subsequently, a processing circuit $PC_R$ executes down-conversion, analog-to-digital conversion, and Fourier transformation on a signal that has been subjected to receive beamforming, and a digital signal processor $DC_R$ subjects the signal to digital postcoding (matrix calculation), thereby generating (regenerating) M streams.

In addition to achieving any one of a plurality of beam candidates (BF weight candidates) by use of a variable phase shifter PS and amplitude adjuster AA as described above, analog signal processors AC ($AC_T$ and $AC_R$) may be configured so as to comprise a plurality of processing circuits corresponding to the plurality of beam candidates, and select any one of the processing circuits by using a control switch.

The above-stated configuration is especially suited to a massive-MIMO transmission scheme in which the number $N_T$ of transmission antennas is sufficiently large with respect to the number M of streams to be transmitted (in other words, M<<$N_T$). Generally, when the number $N_T$ of transmission antennas is greater than the number M of transmission streams (M<$N_T$), it is necessary to carry out prior to transmission of a radio signal an $N_T$-by-M matrix calculation, by which M stream components are converted into $N_T$ transmission antenna components. In the present embodiment, in mathematical terms, M stream components are converted into $N_T$ transmission antenna components by means of matrix calculation of an $L_T$-by-M precoding matrix P and an $N_T$-by-$L_T$ transmit BF weight matrix $W_T$, as described above.

In the above-stated configuration, only precoding is executed by digital signal processor $DC_T$ on the transmission side. Therefore, compared to a configuration in which precoding and transmit beamforming are digitally processed, the circuit size and computational complexity of digital signal processor $DC_T$ can be reduced, and the number of digital-to-analog converter (processing circuit $PC_T$) channels can be reduced. Accordingly, simplification of the configuration and use of a large number of transmission antennas $A_T$ can be achieved simultaneously. The same applies to the reception side (postcoding and receive beamforming).

1 (2). Determination of Weight Matrix

In signal processing of massive-MIMO transmission, a plurality of the above-stated weight matrices (P, $W_T$, $W_R$, B) are used. The channel capacity C in massive-MIMO transmission is calculated by using the following numerical formula (2) with the stated weight matrices.

$$C = \log_2 \det(I + \gamma B W_R H W_T P P^H W_T^H H^H W_R^H B^H) \quad (2)$$

Here, in numerical formula (2) (modified Shannon formula), I is a unit matrix, and γ is the reception SNR (signal-to-noise ratio). Further, $(\bullet)^H$ indicates a conjugate transpose matrix.

Channel capacity C can be increased (preferably maximized) by selecting a suitable weight matrix from a plurality of candidates. In one example from the conventional art, an optimum combination of weight matrices is determined by testing, with respect to a plurality of weight matrices, every possible combination of candidate weight matrices selected one by one.

More specifically, if the number of streams is M, the number of precoding matrix P candidates is $N_p$, the number of transmit BF weight matrix (transmission beam pattern) $W_T$ candidates is $N_{WT}$, the number of receive BF weight matrix (reception beam pattern) $W_R$ candidates is $N_{WR}$, and the number of postcoding matrix B candidates is $N_B$, calculation is required $N_P \times (N_{WT})^M \times (N_{WR})^M \times N_B$ times. A massive-MIMO transmission scheme has a larger number of antennas compared to MIMO transmission schemes in the conventional art, and thus also has a large number of candidate beam patterns. Therefore, if the above combination determination system is adopted, the computational complexity increases in geometric progression, posing a problem of an increased processing load.

In a configuration in which analog beamforming is adopted, channel matrices $H_c$ cannot be observed, making it necessary to measure transmission characteristics by actual transmission/reception of radio signals.

Accordingly, in the present embodiment, in place of testing every possible combination of weight matrices, a suitable transmit BF weight matrix $W_{T,opt}$ and a suitable receive BF weight matrix $W_{R,opt}$ are first determined, and those determined BF weight matrices are used to determine a suitable precoding matrix $P_{opt}$ and a suitable postcoding matrix $B_{opt}$ (hereafter, transmit BF weight matrix, receive BF weight matrix, precoding matrix and postcoding matrix may be collectively referred to as "weight matrices"). By determining suitable weight matrices in stages as described above, a number of combinations to be calculated is reduced, thereby reducing a computational complexity.

Since a massive-MIMO transmission scheme has a larger number of transmitter (small base station MMNB) antennas than receiver (user equipment UE) antennas, it is possible to obtain greater transmit beamforming gain. Accordingly, in the present embodiment, a transmit BF weight is first determined, and a receive BF weight is subsequently determined.

Figure 6:
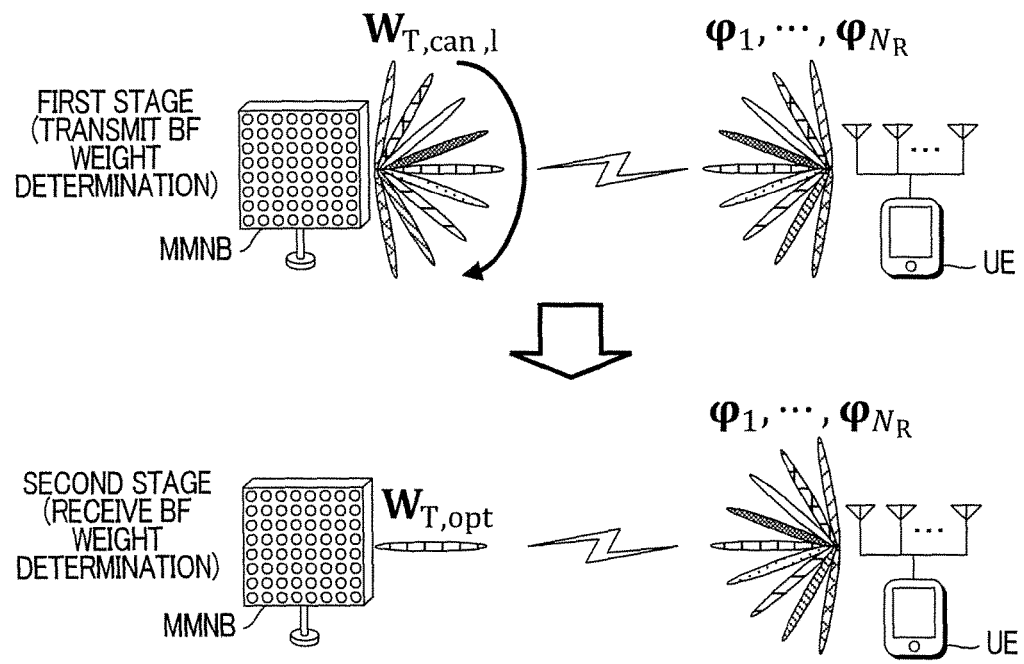
FIG. 6 is a drawing of an outline of BF weight determination as in the first embodiment.

FIG. 6 is a drawing outlining the BF weight determination, as employed in the first embodiment. In the first stage, the transmit BF weight having the highest reception power in user equipment UE is selected from among tested transmit BF weights by switching the transmission weight (transmission beam) candidates in small base station MMNB. User equipment UE generates a plurality of orthogonal beams (reception orthogonal BF weights) and executes a reception operation.

In the second stage, reception power is measured for each of the plurality of orthogonal beams (reception orthogonal BF weight) in user equipment UE, and a predetermined number of receive BF weights that achieve the highest reception power are selected. In the second stage, small base station MMNB executes transmit beamforming based on the suitable transmit BF weight selected in the first stage.

The following is a specific explanation of the details of the BF weight determination of the present embodiment with reference to FIGS. 7-12.

Figure 7:
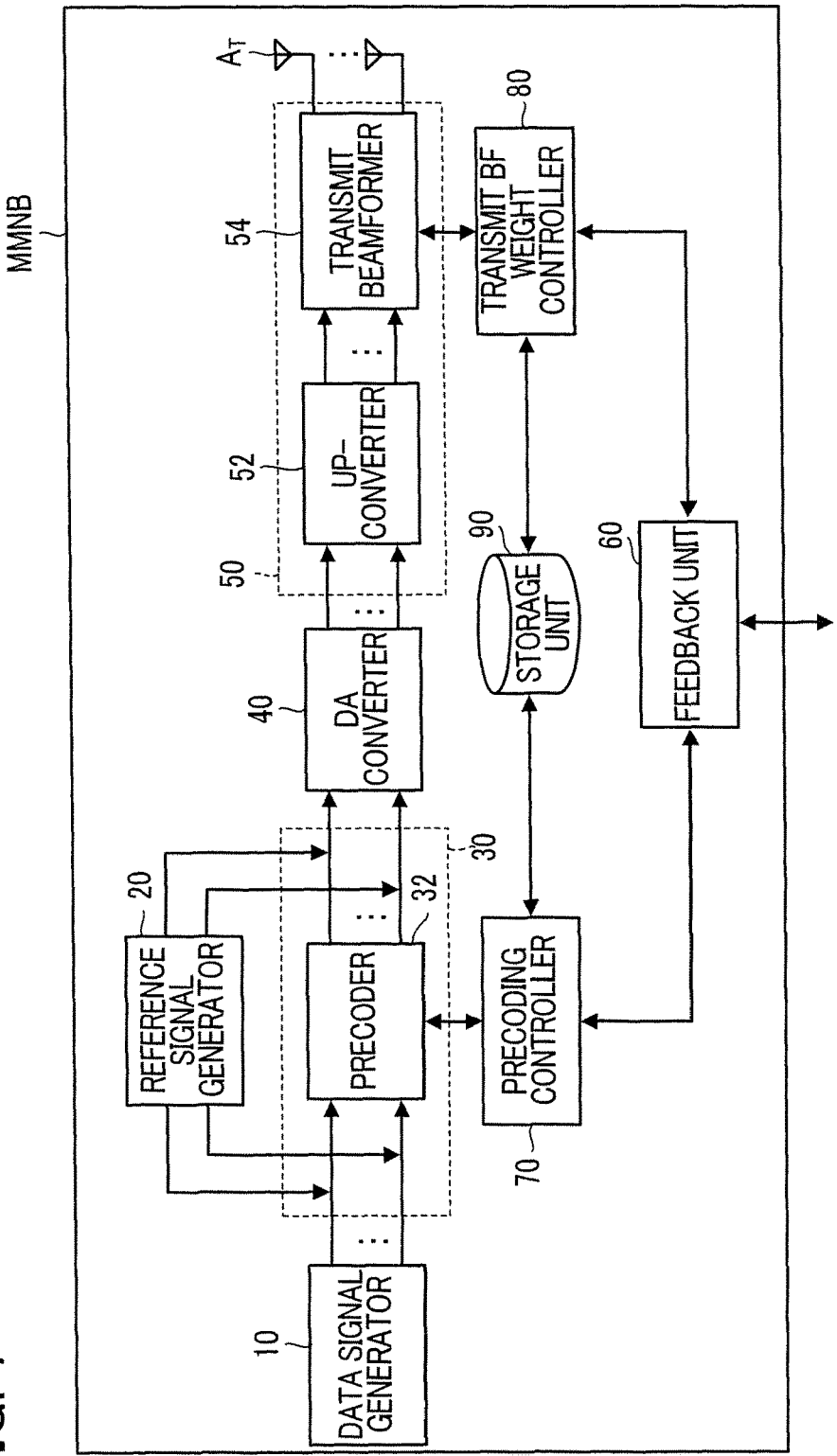
FIG. 7 is a functional block diagram of a small base station as in the first embodiment.

FIG. 7 is a functional block diagram illustrating the main constituent elements of small base station MMNB (transmitter device) of the first embodiment. Small base station MMNB comprises a data signal generator 10, a reference signal generator 20, a baseband processor 30, a digital-to-analog converter 40, an RF processor 50, a feedback unit 60, a precoding controller 70, a transmit BF weight controller 80, and a storage unit 90. Baseband processor 30 comprises a precoder 32, and RF processor 50 comprises an up-converter 52 and a transmit beamformer 54. A number $N_T$ of transmission antennas $A_T$ are connected to transmit beamformer 54.

Data signal generator 10 generates data signals to be included in signals transmitted to user equipment UE. Data signal processor 10 can generate data signals as a stream of a plurality of sequences. In the present embodiment, data signal generator 10 is assumed to generate data signals of M (M is an integer of 2 or more) streams.

Reference signal generator 20 generates reference signals to be included in signals transmitted to user equipment UE. A reference signal is, for example, a signal used for channel estimation in user equipment UE, initial synchronization of user equipment UE and small base station MMNB, and identification of small base station MMNB in user equipment UE. Reference signal generator 20 can also generate reference signals of a plurality of sequences (M streams). Generated data signals and reference signals are input to baseband processor 30 as baseband signals.

Baseband processor 30 is an element that processes input baseband signals (data signals and reference signals). Baseband processor 30 comprises a precoder 32 that subjects a number M of streams to digital precoding (matrix calculation) by using a precoding matrix P.

In an ordinary radio transmission, a signal in which a data signal and a reference signal are combined is precoded by precoder 32, and output from baseband processor 30. Meanwhile, concerning BF weight determination in the present embodiment, a reference signal that has not been precoded is output from baseband processor 30.

Digital-to-analog converter 40 converts digital signals output from processor 30 into analog signals, and outputs the signals to RF processor 50.

RF processor 50 is an element that processes input analog signals and transmits the signals from transmission antennas $A_T$. RF processor 50 comprises up-converter 52 that frequency-converts input analog signals into radio frequency (RF) signals, and transmit beamformer 54 that subjects signals that have been frequency-converted to analog transmit beamforming based on a transmit BF weight matrix $W_T$. High frequency signals output from transmit beamformer 54 are transmitted from a number $N_T$ of transmission antennas $A_T$. The above-stated analog transmit beamforming is a process in which phase and amplitude change corresponding to the multiplication of transmit BF weight matrices is applied to a number M of analog signals by using variable phase shifter PS and amplitude adjuster AA. In other words, in the above-stated analog transmit beamforming, the phase and amplitude between a plurality of transmission antennas $A_T$ (between signals transmitted from a plurality of transmission antennas $A_T$) are changed in an analog manner so as to correspond to the multiplication of the transmit BF weight matrix.

Feedback unit 60 is an element that performs communication pertaining to control with user equipment UE, and in particular, supplies feedback information from user equipment UE to precoding controller 70 and transmit BF weight controller 80. Precoding controller 70 controls precoding matrices used in precoder 32. Transmit BF weight controller 80 controls a BF weight used in transmit beamformer 54. Storage unit 90 stores information pertaining to control of radio communication (for example, precoding matrices, and transmit BF weight matrices).

Of the units included in small base station MMNB, those that carry out digital processing (for example, data signal generator 10, reference signal generator 20, baseband processor 30, feedback unit 60, precoding controller 70, and transmit BF weight controller 80) are functional blocks attained by use of a central processing unit (CPU), which is not illustrated, executing a computer program stored in storage unit 90 and functioning in accordance with the computer program.

Figure 8:
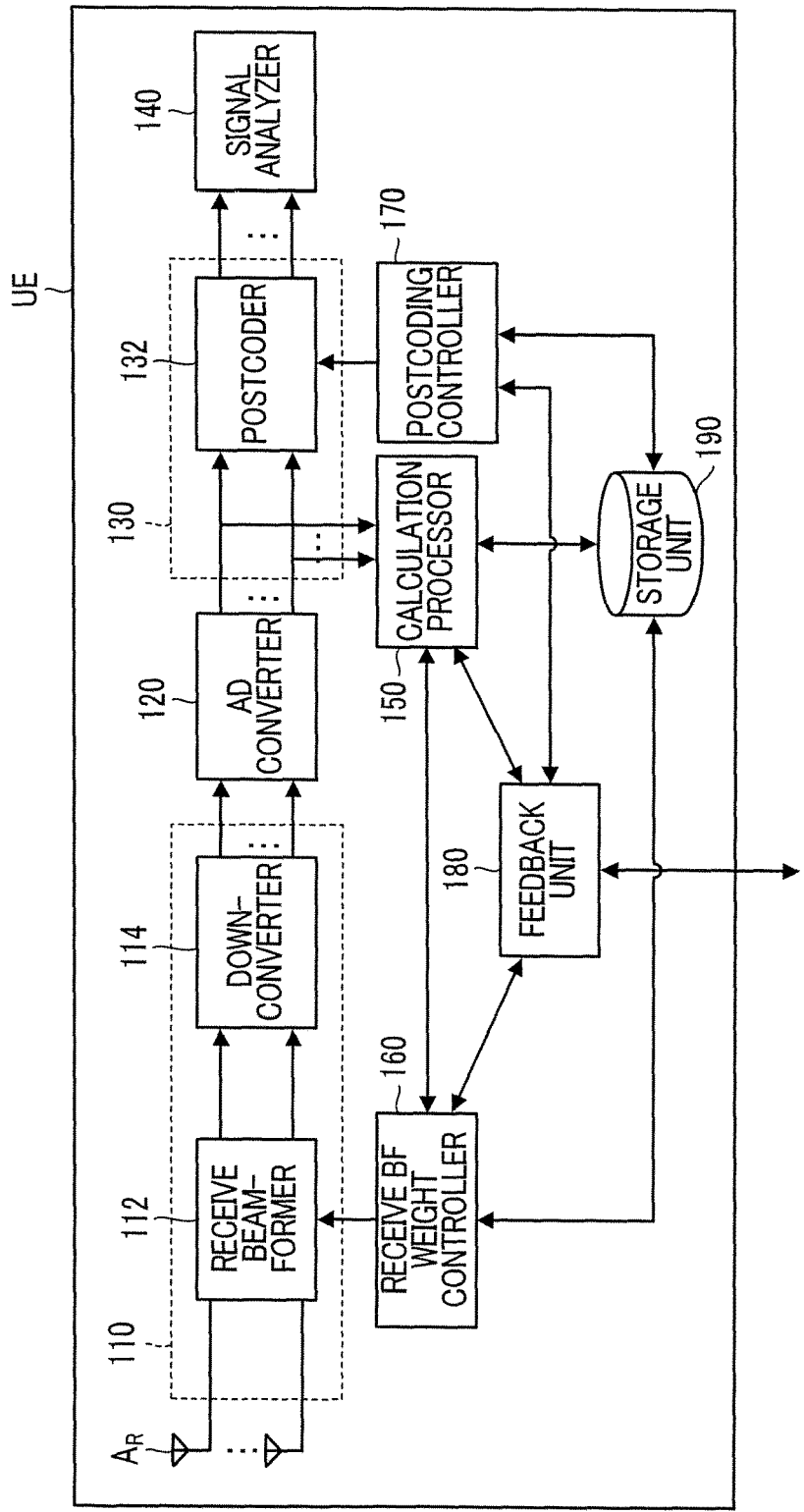
FIG. 8 is a functional block diagram of a user equipment as in the first embodiment.

FIG. 8 is a functional block diagram illustrating the main constituent elements of user equipment UE (receiver device) of the first embodiment. User equipment UE comprises an RF processor 110, an analog-to-digital converter 120, a baseband processor 130, a signal analyzer 140, a calculation processor 150, a receive BF weight controller 160, a postcoding controller 170, a feedback unit 180, and a storage unit 190. RF processor 110 comprises a receive beamformer 112 and a down-converter 114, and baseband processor 130 comprises a postcoder 132. A number $N_R$ of reception antennas $A_R$ are connected to receive beamformer 112.

Radio signals transmitted from small base station MMNB, which is a transmitter device, and that have propagated through a space, are received by a number $N_R$ of reception antennas $A_R$ and input to RF processor 110.

Figure 9:
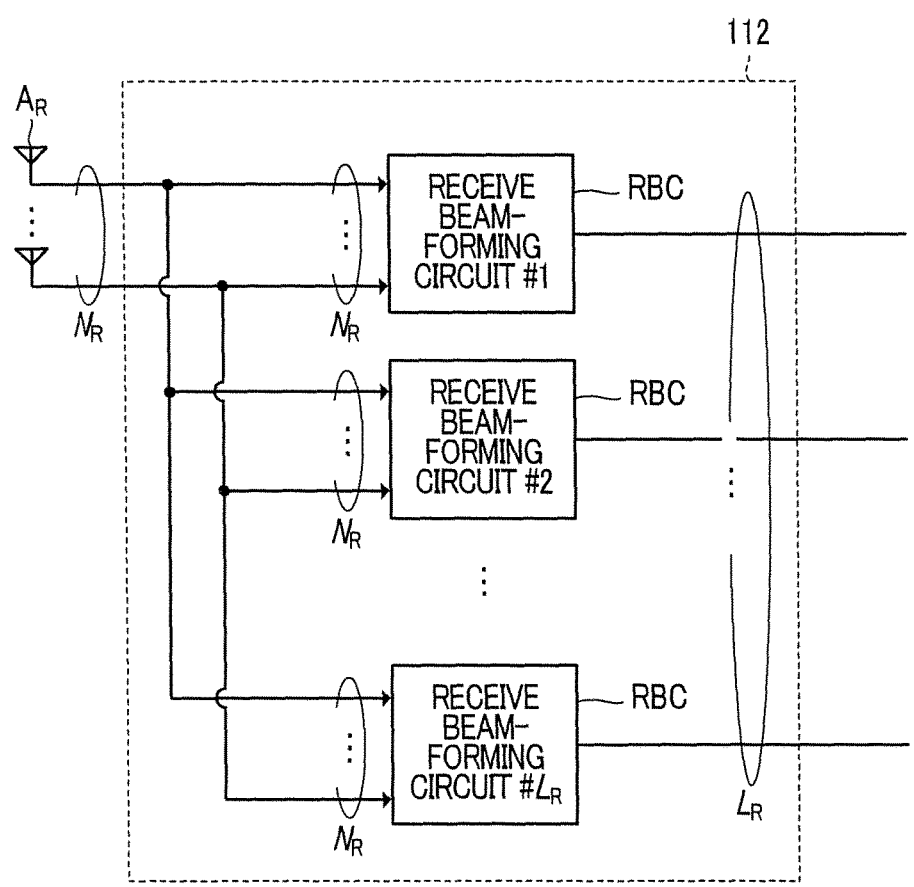
FIG. 9 is a drawing illustrating a detailed configuration of a receive beamformer in the first embodiment.

RF processor 110 is an element that processes signals received by a plurality of reception antennas $A_R$. RF processor 110 comprises a receive beamformer 112 that subjects received signals to analog receive beamforming based on a receive BF weight matrix $W_R$, and a down-converter 114 that frequency-converts the input signals into baseband signals and outputs the signals. As illustrated in FIG. 9, receive beamformer 112 comprises a number $L_R$ of receive beamforming circuits RBC. A number $N_R$ of reception antennas $A_R$ are branched and connected to each of the receive beamforming circuits RBC. Accordingly, radio signals received by the $N_R$ reception antennas $A_R$ are input to each of receive beamforming circuits RBC and are subjected to receive beamforming. One receive beamforming circuit RBC corresponds to one component (one receive BF weight vector) of a receive BF weight matrix $W_R$.

The above-stated analog receive beamforming is a process in which phase and amplitude change corresponding to multiplication of receive BF weight matrices is applied to a number $N_R$ of analog signals by using variable phase shifter PS and amplitude adjuster AA. In other words, in the above-stated analog receive beamforming, the phase and amplitude between a plurality of reception antennas $A_R$ (between signals transmitted from a plurality of reception antennas $A_R$) change in an analog manner so as to correspond to the multiplication of receive BF weight matrices.

Analog-to-digital converter 120 converts analog signals output from RF processor 110 into digital signals, and outputs the signals to baseband processor 130.

Baseband processor 130 is an element that processes input baseband signals and restores a number M of streams. Baseband processor 130 comprises a postcoder 132 that subjects signals output from analog-to-digital converter 120 to digital postcoding (matrix calculation) by using a postcoding matrix B. M streams are regenerated by the above-stated postcoding. The regenerated M streams are input to signal analyzer 140 and analyzed.

Calculation processor 150 executes, on digital signals output from analog-to-digital converter 120, calculation processing such as calculation of reception power and estimation of transmission/reception characteristics. Receive BF weight controller 160 controls a BF weight used in receive beamformer 112. Postcoding controller 170 controls postcoding matrices used in postcoder 132. Feedback unit 180 is an element that performs communication pertaining to control with small base station MMNB, and in particular, transmits feedback information from calculation processor 150 and receive BF weight controller 160 to small base station MMNB. Storage unit 190 stores information pertaining to control of radio communication control (for example, postcoding matrices, and receive BF weight matrices).

Of the elements included in user equipment UE, elements that carry out digital processing (for example, baseband processor 130, signal analyzer 140, calculation processor 150, receive BF weight controller 160, postcoding controller 170, and feedback unit 180) are functional blocks enabled by use of a central processing unit (CPU), which is not illustrated, that causes a computer program stored in storage unit 190 to be executed, the blocks functioning in accordance with the computer program.

1 (4). Determination of Weight Matrices

Figure 10:
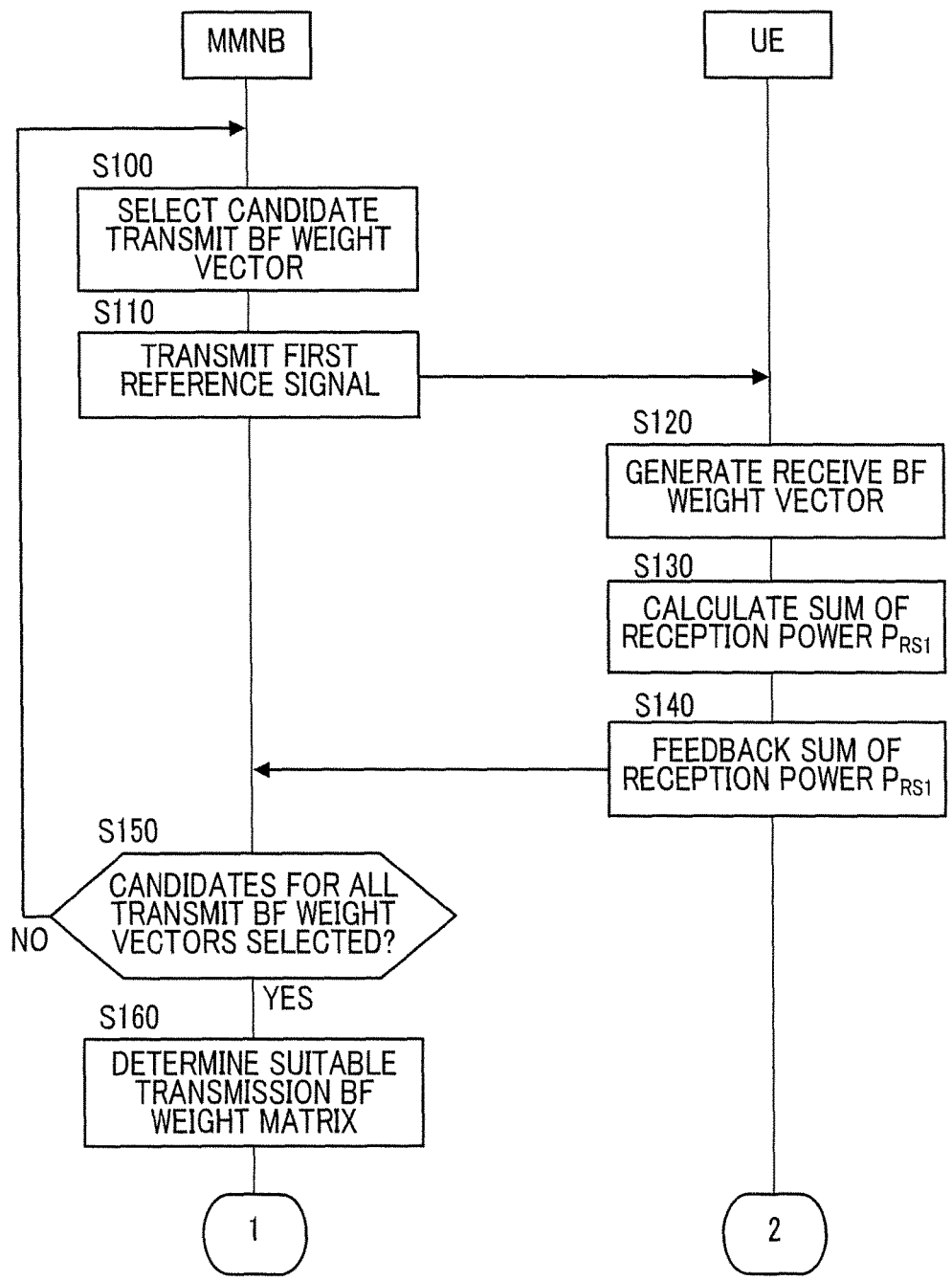
FIG. 10 is a drawing showing a part of an operational flow indicating weight matrix determination of the first embodiment.
Figure 11:
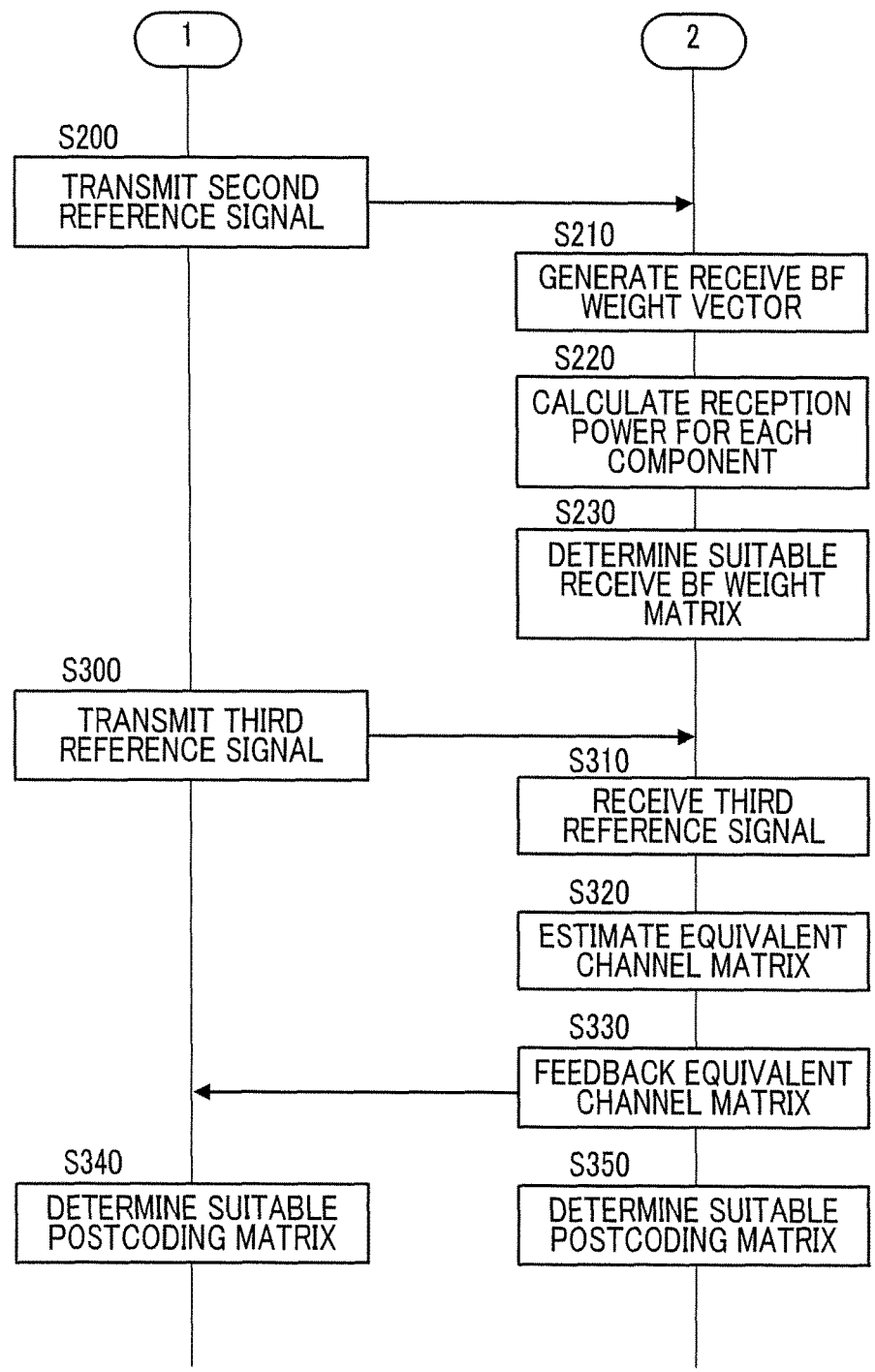
FIG. 11 is a drawing showing a part of the operational flow indicating the weight matrix determination of the first embodiment.

FIGS. 10 and 11 show operational flows indicating the weight matrix determination of the present embodiment. To outline this, according to the weight matrix determination of the present embodiment, as a result of a first stage (determination of suitable transmit BF weight vectors; steps S100-S160) and a second stage (determination of suitable receive BF weight vectors; steps S200-S230) being executed, a suitable (in other words, optimum in the tested range) transmit BF weight matrix $W_{T,opt}=[w_{T,opt,1}\ w_{T,opt,2}\ \cdots\ w_{T,opt,L_T}]$ and receive BF weight matrix $$W_{R,opt} = \begin{bmatrix} w^T_{R,opt,1} \\ w^T_{R,opt,2} \\ \vdots \\ w^T_{R,opt,L_R} \end{bmatrix}$$

are determined.

1 (4)-1. Determination of Suitable Transmit BF Weight Matrices

The following is a detailed explanation of BF weight determination. Once BF weight determination begins, transmit BF weight controller 80 of small base station MMNB selects candidate transmit BF weight vectors $w_{T,can,l}$ from among a plurality (X) of transmit BF weight vector candidates stored in storage unit 90 (S100). Next, transmit BF weight controller 80 applies, to reference signals, phase and amplitude change corresponding to an $N_T$-by-M candidate transmit BF weight matrix $W_{T,can,l}=[w_{T,can,l}\ 0_{N_T}\ \cdots\ 0_{N_T}]$ including the selected candidate transmit BF weight vectors (in other words, subjects the reference signals to analog transmit beamforming), and controls transmit beamformer 54 so as to execute transmission from a number $N_T$ of transmission antennas $A_T$ (S110). Here, $0_{N_T}$ is an $N_T$-by-1 zero vector. As described above, in the determination of a BF weight, reference signals that have not been precoded are subjected to transmit beamforming and transmitted. Hereafter, reference signals $s_{RS1}$, which are subjected to transmit beamforming and transmitted in step S110, are sometimes collectively referred to as a first reference signal RS1.

The $N_R$-by-1 received signal vector $$r_{RS1} = \begin{bmatrix} r_{RS1,1} \\ r_{RS1,2} \\ \vdots \\ r_{RS1,N_R} \end{bmatrix} = H_c W_{T,can,1} s_{RS1} + z$$

corresponding to the first reference signal RS1 received by the $N_R$ reception antennas $A_R$ are branched, and input to each of the $L_R$ receive beamforming circuits RBC in receive beamformer 112.

Receive BF weight controller 160 of user equipment UE controls receive beamformer 112 ($L_R$ receive beamforming circuits RBC) so as to subject received signal vectors to receive beamforming in time division. The l-th (l=1 to $L_R$) receive beamforming circuit RBC executes receive beamforming on received signal vectors by using reception orthogonal BF weight vectors $$\varphi_l = \begin{bmatrix} A_1 e^{j\Phi_{l,1}} & A_2 e^{j\Phi_{l,2}} & \ldots & A_{N_R} e^{j\Phi_{l,N_R}} \end{bmatrix}^T$$

based on the above-stated control. In the above formula, $A_n$ indicates amplitude adjustment amount, and $e^{j\Phi_{l,n}}$ indicates phase rotation amount. That is, n-th component $$A_n e^{j\Phi_{l,n}}$$

indicates amplitude adjustment amount and phase rotation amount with respect to reception signal component $r_{RS1,n}$ corresponding to the n-th reception antenna $A_R$ from among the $N_R$ reception antennas $A_R$. In the present embodiment, $A_1 = A_2 = \ldots = A_{N_R}$ holds in the above formula.

A number $L_R$ of receive beamforming circuits RBC execute the above-stated receive beamforming operation ($N_R/L_R$) times in time division based on the control by receive BF weight controller 160, thereby generating an $N_R$-by-1 receive BF output vector $$y_{RS1} = \begin{bmatrix} y_{RS1,1} \\ y_{RS1,2} \\ \vdots \\ y_{RS1,N_R} \end{bmatrix} = \begin{bmatrix} \varphi_1^T \\ \varphi_2^T \\ \vdots \\ \varphi_{N_R}^T \end{bmatrix} r_{RS1}. \quad (S120)$$

That is, $L_R$ receive beamforming circuits RBC generate $N_R$ orthogonal reception beams in time division, to receive first reference signal RS1. Hereafter, the $N_R$ row components included in receive BF output vectors are collectively referred to as receive BF output components. As can be understood from the above formula, one receive BF output component $y_{RS1,n}$ corresponds to one reception orthogonal BF weight vector $\varphi_n^T$. In the above formula, the $N_R$ reception orthogonal BF weight vectors multiplied by the received signal vectors are orthogonal to one another.

By receiving first reference signal RS1 in time division, receive BF output vectors $y_{RS1}$ output from receive beamformer 112 are input to calculation processor 150 via downconverter 114 and analog-to-digital converter 120. Calculation processor 150 calculates the sum of the power of the receive BF output vectors $P_{RS1} = \Sigma_{l=1}^{N_R} \|y_{RS1,l}\|^2 = \Sigma_{l=1}^{N_R} \|\varphi_l^T r_{RS1}\|^2$ (S130). The calculated sum of reception power $P_{RS1}$ is fed back from user equipment UE to small base station MMNB via feedback unit 180 (S140).

As a result of above steps S100-S140, sum of reception power $P_{RS1}$ in user equipment UE is calculated with respect to selected candidate transmit BF weight vectors $w_{T,can,l}$. The above-stated steps are repeated until all transmit BF weight vectors are selected. That is, if transmit BF weight controller 80 determines in step S150 that not all transmit BF weight vector candidates have been selected (S150; NO), the process returns to step S100, new candidate transmit BF weight vectors are selected, and the sum of reception power $P_{RS1}$ is calculated with respect to the candidate transmit BF weight vectors. In the present example, which has X transmit BF weight vector candidates, the above-stated steps are repeated X times.

Transmit BF weight controller 80 selects a number $L_T$ of candidate transmit BF weight vectors $w_{T,can,1}, w_{T,can,2}, \ldots, w_{T,can,L_T}$ in decreasing order of reception power $P_{RS1}$ in user equipment UE, and determines a suitable transmit BF weight matrix $W_{T,opt} = [w_{T,opt,1} \ w_{T,opt,2} \ \cdots \ w_{T,opt,L_T}]$ (S160).

1 (4)-2. Determination of Suitable Receive BF Weight Matrices

The operational flow continues in FIG. 11. Transmit BF weight controller 80 of small base station MMNB subjects reference signals to analog transmit beamforming by using the suitable transmit BF weight matrix $W_{T,opt}$ determined in step S160, and controls transmit beamformer 54 so as to transmit the signals from $N_T$ transmission antennas $A_T$ (S200). As described above, reference signals that have not been precoded are subjected to transmit beamforming and then transmitted. Hereafter, reference signals $s_{RS2}$ transmitted in step S200 are sometimes referred to as a second reference signal RS2.

The $N_R$-by-1 received signal vectors $$r_{RS2} = \begin{bmatrix} r_{RS2,1} \\ r_{RS2,2} \\ \vdots \\ r_{RS2,N_R} \end{bmatrix} = H_c W_{T,opt} s_{RS2} + z$$

received by $N_R$ reception antennas $A_R$ are branched and input to each of $L_R$ receive beamforming circuits RBC in receive beamformer 112.

Receive BF controller 160 of user equipment UE, as described in step S120, controls receive beamformer 112 ($L_R$ receive beamforming circuits RBC) so as to subject received signal vectors to receive beamforming in time division. The l-th (l=1 to $L_R$) receive beamforming circuit RBC executes receive beamforming on received signal vectors by using reception orthogonal BF weight vectors $$\varphi_l = \begin{bmatrix} A_1 e^{j\Phi_{l,1}} & A_2 e^{j\Phi_{l,2}} & \ldots & A_{N_R} e^{j\Phi_{l,N_R}} \end{bmatrix}^T$$

based on the above-stated control. Explanation of each value in the above-stated formula is the same as the explanation in aforementioned section 1 (4)-1.

A number $L_R$ of receive beamforming circuits RBC execute the above-stated receive beamforming ($N_R/L_R$) times in time division based on the control by receive BF weight controller 160, thereby generating $N_R$-by-1 receive BF output vectors $$y_{RS2} = \begin{bmatrix} y_{RS2,1} \\ y_{RS2,2} \\ \vdots \\ y_{RS2,N_R} \end{bmatrix} = \begin{bmatrix} \varphi_1^T \\ \varphi_2^T \\ \vdots \\ \varphi_{N_R}^T \end{bmatrix} r_{RS2}. \quad (S120)$$

That is, $L_R$ receive beamforming circuits RBC generate $N_R$ orthogonal reception beams in time division, and receive second reference signal RS2. Here, as described above, the above $N_R$ reception orthogonal BF weight vectors are orthogonal to one another.

By receiving second reference signal RS2 in time division, receive BF output vectors $y_{RS2}$ output from receive beamformer 112 are input to calculation processor 150 via down-converter 114 and analog-to-digital converter 120. Calculation processor 150 calculates, for each of $N_R$ receive BF output components included in receive BF output vectors $y_{RS2}$, reception power $\|\varphi_1^T r_{RS2}\|^2$, $\|\varphi_2^T r_{RS2}\|^2$, ..., $\|\varphi_{N_R}^T r_{RS2}\|^2$ (S220).

Next, calculation processor 150 selects $L_R$ receive BF output components in decreasing order of reception power, and determines a suitable receive BF weight matrix $$W_{R,opt} = \begin{bmatrix} w_{R,opt,1}^T \\ w_{R,opt,2}^T \\ \vdots \\ w_{R,opt,L_R}^T \end{bmatrix} = \begin{bmatrix} \varphi_{1'}^T \\ \varphi_{2'}^T \\ \vdots \\ \varphi_{L_R'}^T \end{bmatrix}$$

including $L_R$ reception orthogonal BF weight vectors $\varphi_1^T$, $\varphi_2^T$, ..., $\varphi_{L_R}^T$, corresponding to the selected receive BF weight output components (S230).

Each component in the suitable receive BF weight matrix is determined so as not to overlap with another component, that is, so as to satisfy the following formula (3).

$$w_{R,opt,1} \neq \ldots \neq w_{R,opt,j} \neq \ldots \neq w_{R,opt,L_R} \quad (3)$$

In other words, the suitable receive BF weight matrix includes a number $L_R$ of independent reception orthogonal BF weight vectors.

1 (4)-3. Determination of Suitable Precoding Matrices and Suitable Postcoding Matrices.

A suitable precoding matrix $P_{opt}$ and a suitable postcoding matrix $B_{opt}$ are determined based on the suitable transmit BF weight matrix $W_{T,opt}$ and suitable receive BF weight matrix $W_{R,opt}$ that have been determined as described above.

Transmit BF weight controller 80 of small base station MMNB controls transmit beamformer 54 so as to subject reference signals to analog transmit beamforming based on the suitable transmit BF weight matrix, and transmit the signals from $N_T$ transmission antennas $A_T$ (S300). Hereafter, reference signals $s_{RS3}$ transmitted in step S300 are sometimes referred to as third reference signal RS3.

Receive BF weight controller 160 of user equipment UE controls receive beamformer 112 so as to subject third reference signal RS3 received by reception antennas $A_R$ to analog receive beamforming based on a suitable receive BF weight matrix (S310).

Third reference signal RS3 received by receive beamformer 112 is input to calculation processor 150 via down-converter 114 and analog-to-digital converter 120. Calculation processor 150 estimates an equivalent channel matrix $W_{R,opt}H_cW_{T,opt}$ by using the input third reference signal RS3 (S320).

The above-stated equivalent channel matrix is a characteristic matrix indicating signal change caused by transmit beamforming, spatial propagation (channel matrix) and receive beamforming. The estimation of the equivalent channel matrix described above is executed in the same way as a general channel estimation. For example, estimation of an equivalent channel matrix by using the least squares method can be adopted. The estimated equivalent channel matrix is fed back to small base station MMNB from user equipment UE via feedback unit 180 (S330).

Subsequently, a suitable precoding matrix and a suitable postcoding matrix are determined by using the estimated equivalent channel matrix. The suitable precoding matrix is determined in small base station MMNB (S340), and the suitable postcoding matrix is determined in user equipment UE (S350). The following is a more specific explanation thereof.

The equivalent channel matrix is subjected to single value decomposition as shown in the following formula (4).

$$W_{R,opt}H_cW_{T,opt}=VDU^H \quad (4)$$

In the above formula (4), the left singular matrix V and right singular matrix U are both M-by-M unitary matrices, and singular value matrix D is an M-by-M diagonal matrix having the singular value of an equivalent channel matrix $W_{R,opt}H_cW_{T,opt}$ as a diagonal component.

Accordingly, transmit BF weight controller 80 of small base station MMNB determines suitable precoding matrices as follows: $P_{opt}$ U, and receive BF weight controller 160 of user equipment UE determines suitable postcoding matrices as follows: $B_{opt}=V^H$. As a result of the above-stated determinations, an Eigenmode channel is formed on the MIMO transmission path, making separation of M streams possible.

In addition to weight matrices being determined by single value decomposition such as those described above, suitable postcoding matrices can be determined based on the MMSE (minimal mean square error) rule, as explained below.

A suitable precoding matrix is determined by single value decomposition as described above. According to the MMSE rule, a suitable postcoding matrix is represented as shown in the following formula (5).

$$B_{opt}=(\tilde{H}P_{opt}(\tilde{H}P_{opt})^H+\gamma^{-1}I)^{-1}(\tilde{H}P_{opt})^H \quad (5)$$

In formula (5), $\gamma$ is a reception SNR, $\tilde{H}$ is an equivalent channel matrix $W_{R,opt}H_cW_{T,opt}$, and I is an M-by-M unit matrix.

When a suitable postcoding matrix is determined based on the MMSE rule as described above, the estimation error of an equivalent channel matrix can be reduced by use of a reception SNR. Accordingly, a suitable postcoding matrix can be determined with higher accuracy.

In addition to determination of a suitable precoding matrix and suitable postcoding matrix as described above, precoding and postcoding based on a code book, which is a conventional technique, may be adopted.

1 (5). Effects of the Present Embodiment

According to the configuration of the present embodiment described above, weight matrices are determined in stages. That is, a suitable transmit BF weight and a suitable receive BF weight are first determined, and a suitable precoding weight and a suitable postcoding weight are determined based thereupon. Accordingly, the number of combinations to be calculated is suppressed compared to a configuration in which every possible combination of weight matrices (a transmit BF weight, receive BF weight, precoding weight and postcoding weight) are tested to determine suitable matrices. As a result, the computational complexity required for weight matrix determination is reduced, while suitable weight matrices are determined.

Further, in the present embodiment, orthogonal beams are generated by beamforming in user equipment UE and reference signals are received also in the first stage in which a suitable transmit BF weight is determined. As a result, receive beamforming gain can be obtained compared to a configuration in which orthogonal beams are not generated, making accurate selection of a suitable transmit BF weight possible.

2. Second Embodiment

Following is an explanation of a second embodiment of the present invention. In each of the embodiments exemplified below, elements that have effects and functions that are the same as those of the first embodiment are denoted by the same reference signs, and explanation of such elements is omitted, as appropriate.

2 (1). Determination of Weight Matrices

Figure 12:
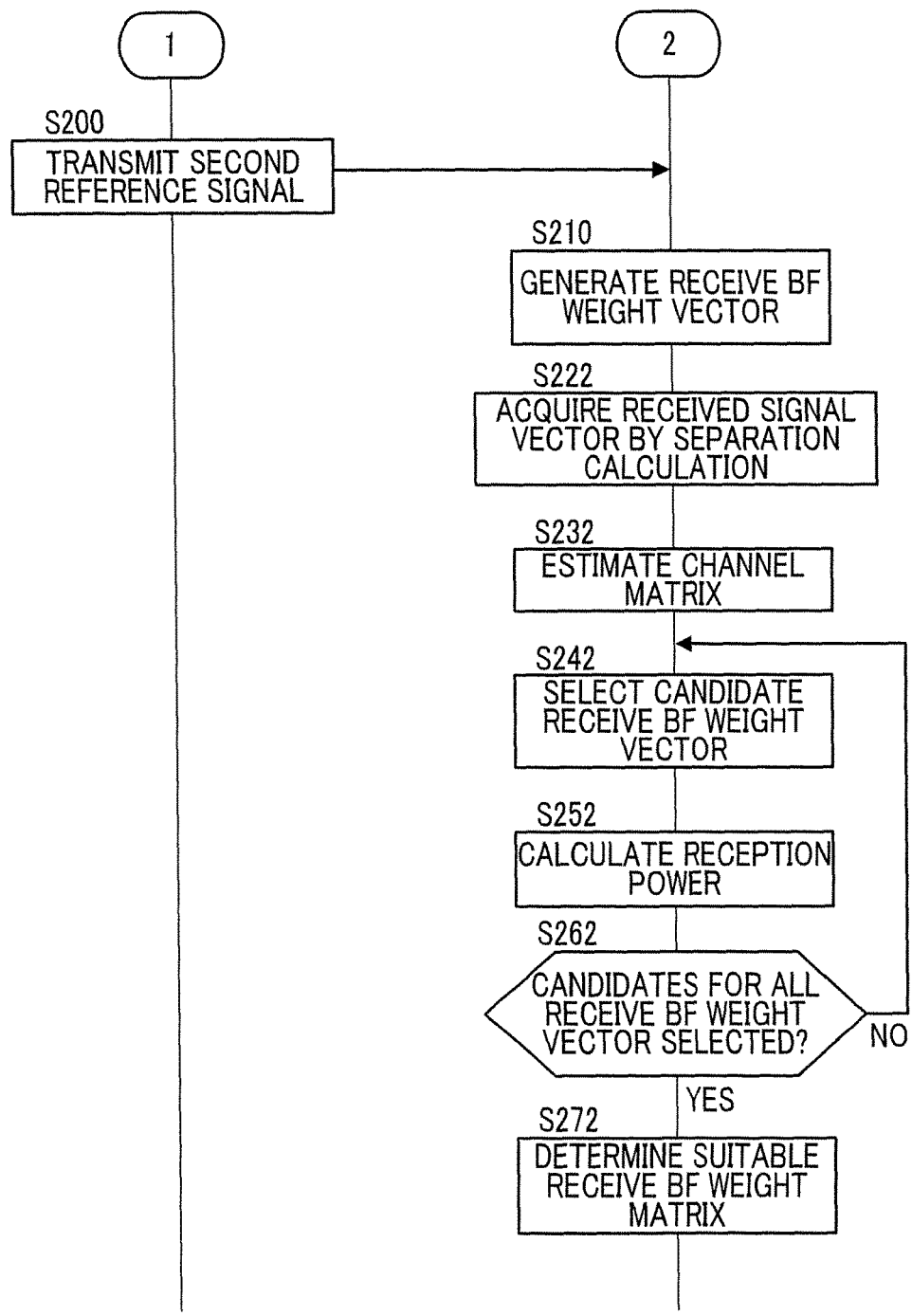
FIG. 12 is a drawing showing a part of an operational flow indicating weight matrix determination of a second embodiment.

FIGS. 10 and 12 are operational flows indicating the weight matrix determination of the present embodiment. As a result of a first stage (steps S100-S160) and a second stage (steps S200-S272) being carried out, a suitable transmit BF weight matrix $$W_{T,opt} = [w_{T,opt,1}\ w_{T,opt,2}\ \cdots\ w_{T,opt,L_T}]$$

and receive BF weight matrix $$W_{R,opt} = \begin{bmatrix} w^T_{R,opt,1} \\ w^T_{R,opt,2} \\ \vdots \\ w^T_{R,opt,L_R} \end{bmatrix}$$

are determined.

2 (1)-1. Determination of Suitable Transmit BF Weight Matrices.

Suitable transmit BF weight matrices are determined using the same method as that used in the first embodiment (FIG. 10). Steps S100 (selection of candidate transmit BF weight vectors $w_{T,can,1}$) to S120 (generation of receive BF output vectors) are carried out, and $N_R$-by-1 receive BF output $$\text{vectors } y_{RS1} = \begin{bmatrix} y_{RS1,1} \\ y_{RS1,2} \\ \vdots \\ y_{RS1,N_R} \end{bmatrix} = \begin{bmatrix} \varphi^T_1 \\ \varphi^T_2 \\ \vdots \\ \varphi^T_{N_R} \end{bmatrix} r_{RS1}$$

are generated.

By receiving first reference signal RS1 in time division, receive BF output vectors $y_{RS1}$ output from receive beamformer 112 are input to calculation processor 150. Calculation processor 150 calculates the sum of receive BF output vectors $P_{RS1} = \Sigma_{l=1}^{N_R} \|y_{RS1,l}\|^2 = \Sigma_{l=1}^{N_R} \|\varphi_l^T r_{RS1}\|^2$ (S130), and feeds back to small base station MMNB via feedback unit 180 (S140). Steps S100 to S140 described above are carried out for all (X) transmit BF weight vector candidates (S100-S150).

Transmit BF weight controller 80 of small base station MMNB selects a number $L_T$ of candidate transmit BF weight vectors $w_{T,can,1}, w_{T,can,2}, \ldots, w_{T,can,L_T}$ in decreasing order of sum of reception power $P_{RS1}$ in user equipment UE, and determines a suitable transmit BF weight matrix $W_{T,opt} = [w_{T,opt,1}\ w_{T,opt,2}\ \cdots\ w_{T,opt,L_T}]$ (S160).

2 (1)-2. Determination of Suitable Receive BF Weight Matrices

Steps S200 (transmission of second reference signal) and S210 (generation of receive BF output vectors) are carried out using the same method as that used in the first embodiment, and an $N_R$-by-1 receive BF output vector $$y_{RS2} = \begin{bmatrix} y_{RS2,1} \\ y_{RS2,2} \\ \vdots \\ y_{RS2,N_R} \end{bmatrix} = \begin{bmatrix} \varphi^T_1 \\ \varphi^T_2 \\ \vdots \\ \varphi^T_{N_R} \end{bmatrix} r_{RS2}$$

is generated and input to calculation processor 150. The above-stated receive BF output vector is represented as follows:

$$y_{RS2} = \begin{bmatrix} \varphi^T_1 \\ \varphi^T_2 \\ \vdots \\ \varphi^T_{N_R} \end{bmatrix} r_{RS2} = [\Psi_1\ \Psi_2\ \cdots\ \Psi_{N_R}] r_{RS2}.$$

In the above formula, $\Psi_{n_R}$ is an $N_R$-by-1 orthogonal vector that includes a component $$A_{n_R} e^{j\Phi_{1,n_R}}, A_{n_R} e^{j\Phi_{2,n_R}}, \ldots, A_{n_R} e^{j\Phi_{N_R,n_R}}$$

corresponding to the $n_R$th ($1 \le n_R \le N_R$) reception antenna $A_R$ included in each of $N_R$ reception orthogonal BF weight vectors $\varphi_1^T, \varphi_2^T, \ldots, \varphi_{N_R}^T$.

Calculation processor 150 is able to separate the reception signals in the $n_R$th reception antenna $A_R$ by multiplying (that is, carrying out a separation calculation), from left to right, the separation operator $\omega_{n_R}^T$ corresponding to the $n_R$th reception antenna $A_R$, with respect to reception orthogonal BF weight vectors $y_{RS2} = [\Psi_1\ \Psi_2\ \ldots\ \Psi_{N_R}] r_{RS2}$. The separation calculation is represented by the following formula:

$$r_{RS2,n_R} = \omega_{n_R}^T [\Psi_1\ \Psi_2\ \cdots\ \Psi_{N_R}] r_{RS2}, \text{ where } \omega_k^T \Psi_l = \begin{cases} 1 & (k=l) \\ 0 & (k \ne l) \end{cases}.$$

The above-stated separation operators are set as follows. $\omega_{n_R} = \Psi^*_{n_R}$, where $(\bullet)^*$ indicates a conjugate matrix.

More specifically, for example, when $$\Psi_{n_R} = \frac{1}{\sqrt{N_R}}\left[\, e^{-j\frac{2\pi}{N_R}\cdot 1\cdot n_R} \quad e^{-j\frac{2\pi}{N_R}\cdot 2\cdot n_R} \quad \ldots \quad e^{-j\frac{2\pi}{N_R}\cdot N_R\cdot n_R} \,\right]^T,$$

separation operators are set as follows:

$$\omega_{n_R} = \Psi_{n_R}^* = \frac{1}{\sqrt{N_R}}\left[\, e^{j\frac{2\pi}{N_R}\cdot 1\cdot n_R} \quad e^{j\frac{2\pi}{N_R}\cdot 2\cdot n_R} \quad \ldots \quad e^{j\frac{2\pi}{N_R}\cdot N_R\cdot n_R} \,\right]^T.$$

As a result of calculation processor 150 carrying out the above-stated separation calculation on all $N_R$ reception antennas $A_R$, an $N_R$-by-1 received signal vector $$r_{RS2} = \begin{bmatrix} r_{RS2,1} \\ r_{RS2,2} \\ \vdots \\ r_{RS2,N_R} \end{bmatrix} = H_c W_{T,opt} s_{RS2} + z$$

is acquired from an $N_R$-by-1 receive BF output vector $y_{RS2}$ (S222).

Calculation processor 150 estimates a channel matrix $H_c W_{T,opt}$ using the acquired received signal vector $r_{RS2}$ (S232).

The above-stated channel matrix is a characteristic matrix indicating signal change caused by transmit beamforming and spatial propagation. The above-stated channel matrix estimation is carried out in the same way as general channel estimation. For example, channel matrix estimation using the least squares method can be adopted.

Calculation processor 150 selects candidate receive BF weight vectors $w_{R,can,1}$ from among a plurality (Y (Y≥M (the number of streams))) of receive BF weight vector candidates stored in storage unit 190 (S242). Vectors of choice may be adopted as the receive BF weight vector candidates. For example, a plurality of steering vectors may be adopted as the receive BF weight vector candidates.

Next, calculation processor 150 calculates the reception power F (Frobenius norm) $\|w_{R,can,1}^T H_c W_{T,opt}\|_F^2$ of the selected candidate receive BF weight vectors using estimated channel matrix $H_c N_{T,opt}$ (S252).

The above steps are repeated until all of the receive BF weight vector candidates have been selected. That is, if calculation processor 150 determines in step S262 that not all of the receive BF weight vector candidates have been selected (S262: NO), the process returns to step S242, new candidate receive BF weight vectors are selected, and reception power F is calculated. In the present example, which has Y receive BF weight vector candidates, the above steps are repeated Y times.

Calculation processor 150 selects $L_R$ candidate reception weight vectors $w_{R,can,1}^T, w_{R,can,2}^T, \ldots, w_{R,can,L_R}^T$ in decreasing order of reception power F in user equipment UE, and determines a suitable receive BF weight matrix $$W_{R,opt} = \begin{bmatrix} w_{R,opt,1}^T \\ w_{R,opt,2}^T \\ \vdots \\ w_{R,opt,L_R}^T \end{bmatrix} = \begin{bmatrix} w_{R,can,1'}^T \\ w_{R,can,2'}^T \\ \vdots \\ w_{R,can,L_R'}^T \end{bmatrix}. \quad (S272)$$

Each component in the suitable receive BF weight matrix is determined so as not to overlap with another component, that is, so as to satisfy the following formula (6).

$$w_{R,opt,1} \neq \ldots \neq w_{R,opt,i} \neq \ldots \neq w_{R,opt,L_R} \quad (6)$$

2 (1)-3. Determination of Suitable Precoding Matrices and Suitable Postcoding Matrices A suitable precoding matrix $P_{opt}$ and a suitable postcoding matrix $B_{opt}$ are determined using the same method as that in the first embodiment based on the suitable transmit BF weight matrix $W_{T,opt}$ and suitable receive BF weight matrix $W_{R,opt}$ that have been determined as described above (S300-S350).

2 (2). Effects of the Present Embodiment

The configuration of the present embodiment described above exhibits similar technical effects to those in the first embodiment. Further, since receive BF weight vector candidates can be adopted at choice, suitable receive BF weight matrices can be set in a more flexible manner.

3. Modifications

The embodiments described above may be modified in various ways. Specific modes of modification are exemplified below. Two or more modes selected at choice from among the embodiments described above and the below exemplifications may be combined, as appropriate, provided the modes do not contradict one another.

3 (1). First Modification

In the embodiments described above, $N_R$-by-1 receive BF output vectors are generated by $L_R$ receive beamforming circuits RBC carrying out receive beamforming ($N_R/L_R$) times in time division (steps S120 and S210). In the present modification, $L_R$ receive BF output components that serve as receive BF output vector elements are acquired for each of a number K of phase offsets $\delta_{1, 2, \ldots}$ each of the K phase offsets $\delta_{1, 2, \ldots}$ being added to the $L_R$ reception orthogonal BF vectors per time division process in each of the above-stated steps. By the above-stated time division process being repeated ($N_R/L_R$) times, a number K of $N_R$-by-1 receive BF output vectors that correspond to each of the phase offsets $\delta_{1, 2, \ldots}$ are generated.

Reception orthogonal BF weight vectors corresponding to phase offset $\delta_K$ are represented by the following formula.

$$\varphi_{\delta_k} = \left[\, A_1 e^{j\Phi_{L,1}} \quad A_2 e^{j\Phi_{L,2}+j\frac{2\pi}{\lambda}1\cdot d\sin\delta} \quad \ldots \quad A_{N_R} e^{j\Phi_{L,N_R}+j\frac{2\pi}{\lambda}(N_R-1)d\sin\delta} \,\right]^T$$

Here, the number K and difference ($\delta_{(K+1)} - \delta_K$) of phase offset $\delta$ are arbitrarily determined.

In step S130, a sum of reception power $P_{RS1}$ is calculated for each of the K receive BF output vectors. In step S140, the highest sum of reception power $P_{RS1}$ is fed back to small base station MMNB.

In step S220, reception power is calculated for each of the $N_R$ (that is, a total of ($K \times N_R$)) receive BF output components included in each of the K receive BF output vectors. In step S230, $L_R$ receive BF output components are selected in decreasing order of reception power, and as described above, a suitable receive BF weight matrix is determined.

According to the present modification described above, scanning is performed by adding phase offsets $\delta$ to $L_R$ reception orthogonal BF weights (orthogonal reception beams), enabling detection of directions (beam angles) with higher reception power.

3 (2). Second Modification

In the second embodiment, $N_R$-by-1 received signal vectors $$r_{RS1} = \begin{bmatrix} r_{RS1,1} \\ r_{RS1,2} \\ \vdots \\ r_{RS1,N_R} \end{bmatrix}, r_{RS2} = \begin{bmatrix} r_{RS2,1} \\ r_{RS2,2} \\ \vdots \\ r_{RS2,N_R} \end{bmatrix}$$

are acquired from $N_R$-by-1 receive BF output vectors $y_{RS1}$, $y_{RS2}$ by calculation processor 150 carrying out separation calculation. In addition to the above-stated configuration, received signal vectors may be acquired by receive beamforming circuit RBC bypassing input from reception antennas $A_R$. The following is a specific explanation thereof.

Figure 13:
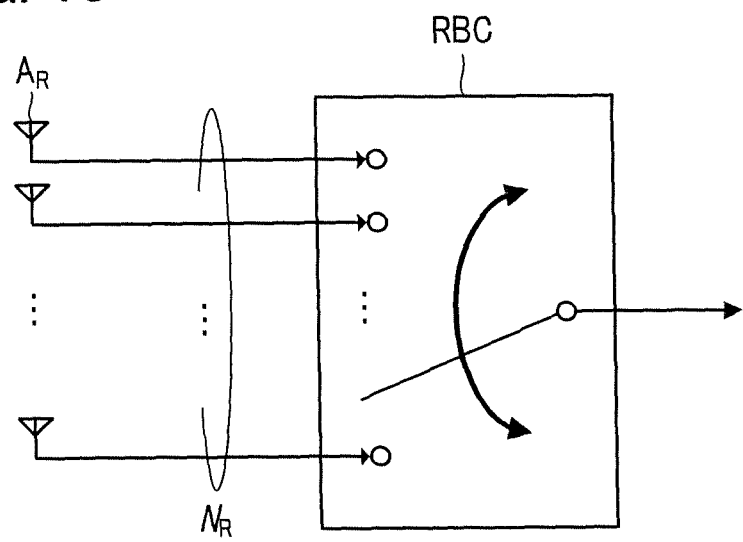
FIG. 13 is a drawing illustrating a detailed configuration of a receive beamforming circuit of a second modification.

FIG. 13 is a drawing illustrating a detailed configuration of receive beamforming circuits RBC of the present modification. In the present modification, each of receive beamforming circuits RBC included in receive beamformer 112 comprises a bypass circuit that selects one of $N_R$ inputs from reception antennas $A_R$ (that is, one of the elements of an $N_R$-by-1 received signal vector) based on the control by receive BF weight controller 160.

$L_R$ receive beamforming circuits RBC included in receive beamformer 112 carry out a bypass receiving operation for acquiring received signal vector elements corresponding to $L_R$ reception antennas $A_R$. By the above-stated bypass receiving operation being carried out ($N_R/L_R$) times in time division, $N_R$-by-1 received signal vectors $$r_{RS1} = \begin{bmatrix} r_{RS1,1} \\ r_{RS1,2} \\ \vdots \\ r_{RS1,N_R} \end{bmatrix}, r_{RS2} = \begin{bmatrix} r_{RS2,1} \\ r_{RS2,2} \\ \vdots \\ r_{RS2,N_R} \end{bmatrix}$$

that include received signal vector elements corresponding to $N_R$ reception antennas $A_R$ are directly (that is, without execution of separation calculation) acquired. The reception operation of the present modification described above is carried out in place of steps S210-S222 in the second embodiment. The other operations are carried out as described in the second embodiment.

3 (3). Third Modification

Transmit beamformer 54 of small base station MMNB may have a full-array configuration in which one transmission beam is generated using all $N_T$ transmission antennas $A_T$, or a sub-array configuration in which one transmission beam is generated using blocks of ($N_T/L_T$) transmission antennas $A_T$. Similarly, receive beamformer 112 of user equipment UE may have a full-array configuration in which one reception beam is generated using all $N_R$ reception antennas $A_R$, or a sub-array configuration in which one reception beam is generated using blocks of ($N_R/L_R$) reception antennas $A_R$.

By adopting a sub-array configuration, the scale of an analog circuit (variable phase shifter PS, added AD, etc.) can be reduced. As a result, loss due to the analog circuit is reduced, and device manufacturing costs are reduced.

3 (4). Fourth Modification

In the embodiments described above, communication of control information (feedback information, etc.) between small base station MMNB and user equipment UE can be carried out using a route of choice. For example, if a radio link is established between small base station MMNB and user equipment UE, control information may be exchanged by direct transmission/reception of radio signals. Further, if the above-stated radio link is not established, small base station MMNB and user equipment UE may transmit/receive control information via macro base station MeNB.

3 (5). Fifth Modification

The configurations in the embodiments described above can be applied to multi-user environments. In the present modification, to achieve multiplexing between multiple users, inter-user interference is preferably suppressed by performing precoding based on block diagonalization.

3 (6). Sixth Modification

In the embodiments described above, rank adaptation, which adaptively controls the number of transmission streams, may be applied. For example, when a maximum of M streams can be transmitted between small base station MMNB and user equipment UE, the number of transmission streams that maximizes a channel capacity C can be determined by first determining a suitable transmit BF weight matrix and a suitable receive BF weight matrix for all M streams.

3 (7). Seventh Modification

In the embodiments described above, small base station MMNB is exemplified as a transmitter device, and user equipment UE is exemplified as a receiver device. However, in the aforementioned weight matrix determination, user equipment UE may function as a transmission-side device, and small base station MMNB may function as a reception-side device. That is, the aforementioned weight matrix determination may also be applied to uplink transmission.

3 (8). Eighth Modification

In the embodiments described above, suitable BF weight matrices are determined for downlink transmission. When a time division duplex (TDD) is adopted in radio communication system 1, a common frequency is used in the uplink and the downlink, thus the suitable BF weight matrices determined for the downlink transmission can also be used for uplink transmission. Meanwhile, when a frequency division duplex (FDD) is adopted in radio communication system 1, suitable BF weight matrices are determined for the downlink transmission, and subsequently a suitable BF weight matrix is determined for the uplink transmission as described in the embodiments. Beamforming gain would preferably be used to determine the suitable BF weight matrix from the transmission side with the largest number of antennas (that is, downlink transmission).

3 (9). Ninth Modification

In the embodiment described above, a suitable transmit BF weight (vector and matrix) is determined on the transmission side (small base station MMNB), and a suitable receive BF weight (vector and matrix) is determined on the reception side (user equipment UE). However, weight determination can be carried out in locations of choice in radio communication system 1. For example, a suitable receive BF weight may be determined on the transmission side, and a suitable transmit BF weight may be determined on the reception side.

Further, in the embodiment described above, suitable precoding matrices are determined on the transmission side (small base station MMNB), and suitable postcoding matrices are determined on the reception side (user equipment UE). However, a suitable precoding matrix and suitable postcoding matrix may be determined on either the transmission side or the reception side.

3 (10). Tenth Modification

The number $L_R$ of receive beamforming circuits RBC are preferably a divisor of the number $N_R$ of reception antennas $A_R$. If the number of times $(N_R/L_R)$ time division processing is performed is indivisible, time division processing should be carried out the number of times obtained by rounding up the first decimal point of $N_R/L_R$.

3 (11). Eleventh Modification

User equipment UE is a device of choice capable of performing radio communication with base stations (macro base station MeNB, and small base station MMNB) in a network. User equipment UE maybe a mobile telephone terminal such as a feature phone or a smartphone, a tablet terminal, a desktop PC, a notebook PC, an ultra-mobile personal computer (UMPC), a portable gaming device, or another type of radio terminal, for example.

3 (12). Twelfth Modification

Each of the functions carried out by the CPU in each of the elements (user equipment UE and small base station MMNB) within communication system 1 may be carried out by hardware in place of a CPU, or may be carried out by a programmable logic device such as a field programmable gate array (FPGA) or a digital signal processor (DSP), for example.

DESCRIPTION OF REFERENCE SIGNS

1 . . . radio communication system,
10 . . . data signal generator,
20 . . . reference signal generator,
30 . . . baseband processor,
32 . . . precoder,
40 . . . digital-to-analog converter,
50 . . . RF processor,
52 . . . up-converter,
64 . . . transmit beamforming unit,
60 . . . feedback unit,
70 . . . precoding controller,
80 . . . transmit BF weight controller,
90 . . . storage unit,
110 . . . RF processor,
112 . . . receive beamforming unit,
114 . . . down-converter,
120 . . . analog-to-digital converter,
130 . . . baseband processor,
132 . . . postcoder,
140 . . . signal analyzer,
150 . . . calculation processor,
160 . . . receive BF weight controller,
170 . . . postcoding controller,
180 . . . feedback unit,
190 . . . storage unit,
AA . . . amplitude adjuster,
$AC(AC_R, AC_T)$ . . . analog signal processor,
AD . . . adder,
$A_R$ . . . reception antenna,
$A_T$ . . . transmission antenna,
C . . . channel capacity,
Cm . . . macro cell,
Cmm . . . Massive-MIMO cell,
$DC_R$ . . . digital signal processor,
$DC_T$ . . . digital signal processor,
MME . . . central control station,
MMNB . . . small base station,
MP . . . multiplier,
MeNB . . . macro base station,
$PC_R$ . . . processing circuit,
$PC_T$ . . . processing circuit,
$P_{RS1}$ . . . reception power,
PS . . . variable phase shifter,
RBC . . . receive beamforming circuit,
UE . . . user equipment.

The invention claimed is:

1. A radio communication control method in a radio communication system, comprising
  a transmitter device provided with
    a precoder configured to carry out precoding by using a precoding matrix,
    a transmit beamformer configured to carry out transmit beamforming, in which variation in phase and amplitude corresponding to a transmit beamforming (BF) weight matrix is imparted to signals after precoding has been executed, and
    a number NT of transmission antennas for transmitting the signals subjected to the transmit beamforming, and
  a receiver device provided with
    a number NR of reception antennas for receiving signals that have been transmitted from the transmitter device and propagated through a space,
    a receive beamformer configured to carry out receive beamforming, in which variation in phase and amplitude corresponding to a receive BF weight matrix is imparted to the signals received by the plurality of reception antennas, and
    a postcoder configured to carry out, by using a postcoding matrix, postcoding on the signals that have been subjected to the analog receive beamforming,
  the method comprising:
    generating a receive BF output vector having a number NR of receive BF output components, by a number LR of receive beamforming circuits provided in the receive beamformer carrying out receive beamforming (NR/LR) times with respect to a received signal vector received by the number NR of the reception antennas;
    calculating reception power for each of the NR receive BF output components; and
    selecting the LR receive BF output components in decreasing order of reception power, and determining a suitable receive BF weight matrix including LR reception orthogonal BF weight vectors corresponding to the selected receive BF output components.

2. The radio communication control method according to claim 1, further comprising:
    prior to the determining of the suitable receive BF weight matrix,
    selecting a candidate transmit BF weight vector from among a plurality of transmit BF weight vector candidates;
    transmitting, from the NT transmission antennas, a reference signal subjected to analog transmit beamforming based on a candidate transmit BF weight matrix including the selected candidate transmit BF weight vector;
    generating a receive BF output vector having a number NR of receive BF output components, by a number LR of receive beamforming circuits carrying out receive beamforming (NR/LR) times with respect to a received signal vector corresponding to the reference signal received by the number NR of the reception antennas;
    calculating the sum of the reception power of the receive BF output vectors;
    acquiring a plurality of the sums of reception power by executing the selection, transmission, generation and calculation on a plurality of the transmit BF weight vector candidates; and selecting the LT transmit BF weight vector candidates in decreasing order of the sum of reception power, and determining a suitable BF weight matrix including the selected LT transmit BF weight vector candidates.

3. The radio communication control method according to claim 2, further comprising:
transmitting, from the transmitter device, a reference signal subjected to analog transmit beamforming based on the suitable transmit BF weight matrix;
estimating an equivalent channel matrix indicating a result of the reference signal received by the receiver device being subjected to analog receive beamforming based on the suitable receive BF weight matrix; and
determining a suitable precoding matrix and a suitable postcoding matrix based on the estimated equivalent channel matrix.

4. A radio communication control method in a radio communication system, comprising
a transmitter device provided with
a precoder configured to carry out precoding by using a precoding matrix,
a transmit beamformer configured to carry out transmit beamforming, in which variation in phase and amplitude corresponding to a transmit beamforming (BF) weight matrix is imparted to signals after precoding has been executed, and
a number NT of transmission antennas for transmitting the signals that have been subjected to the transmit beamforming, and
a receiver device provided with
a number NR of reception antennas for receiving signals that have been transmitted from the transmitter device and propagated through a space,
a receive beamformer configured to carry out receive beamforming, in which variation in phase and amplitude corresponding to a receive BF weight matrix is imparted to the signals received by the plurality of reception antennas, and
a postcoder configured to carry out, by using a postcoding matrix, postcoding on the signals that have been subjected to the analog receive beamforming,
the method comprising:
generating a receive BF output vector having a number NR of receive BF output components, by a number LR of receive beamforming circuits provided in the receive beamformer carrying out receive beamforming (NR/LR) times with respect to a received signal vector received by the number NR of the reception antennas;
acquiring the received signal vector by multiplying each of a number NR of separation operators corresponding to the NR reception antennas with respect to the receive BF output vector;
estimating a channel matrix using the received signal vector;
calculating reception power for each of a plurality of receive BF weight vector candidates using the estimated channel matrix; and
selecting the LR receive BF weight vector candidates in decreasing order of reception power, and determining a suitable receive BF weight matrix including the selected LR receive BF weight vector candidates.

5. The radio communication control method according to claim 4, further comprising:
prior to the determining of the suitable receive BF weight matrix,
selecting a candidate transmit BF weight vector from among a plurality of transmit BF weight vector candidates;
transmitting, from the NT transmission antennas, a reference signal subjected to analog transmit beamforming based on a candidate transmit BF weight matrix including the selected candidate transmit BF weight vector;
generating a receive BF output vector having a number NR of receive BF output components, by a number LR of receive beamforming circuits carrying out receive beamforming (NR/LR) times with respect to a received signal vector corresponding to the reference signal received by the number NR of the reception antennas;
calculating the sum of the reception power of the receive BF output vectors;
acquiring a plurality of the sums of reception power by executing the selection, transmission, generation and calculation on a plurality of the transmit BF weight vector candidates; and
selecting the LT transmit BF weight vector candidates in decreasing order of the sum of reception power, and determining a suitable BF weight matrix including the selected LT transmit BF weight vector candidates.

6. The radio communication control method according to claim 5, further comprising:
transmitting, from the transmitter device, a reference signal subjected to analog transmit beamforming based on the suitable transmit BF weight matrix;
estimating an equivalent channel matrix indicating a result of the reference signal received by the receiver device being subjected to analog receive beamforming based on the suitable receive BF weight matrix; and
determining a suitable precoding matrix and a suitable postcoding matrix based on the estimated equivalent channel matrix.

7. A radio communication control method in a radio communication system, comprising
a transmitter device provided with
a precoder configured to carry out precoding by using a precoding matrix,
a transmit beamformer configured to carry out transmit beamforming, in which variation in phase and amplitude corresponding to a transmit beamforming (BF) weight matrix is imparted to signals after precoding has been executed, and
a number NT of transmission antennas for transmitting the signals that have been subjected to the transmit beamforming, and
a receiver device provided with
a number NR of reception antennas for receiving signals that have been transmitted from the transmitter device and propagated through a space,
a receive beamformer configured to carry out receive beamforming, in which variation in phase and amplitude corresponding to a receive BF weight matrix is imparted to the signals received by the plurality of reception antennas, and
a postcoder configured to carry out, by using a postcoding matrix, postcoding on the signals that have been subjected to the analog receive beamforming,
the method comprising:
acquiring a received signal vector, by each of a number LR of receive beamforming circuits provided in the receive beamformer carrying out a bypass receiving operation that selects and acquires one of the received signal vector elements (NR/LR) times with respect to the received signal vector received by the number NR of the reception antennas;

estimating a channel matrix using the received signal vector;

calculating reception power for each of a plurality of receive BF weight vector candidates using the estimated channel matrix; and selecting the LR receive BF weight vector candidates in decreasing order of reception power, and determining a suitable receive BF weight matrix including the selected LR receive BF weight vector candidates.

8. The radio communication control method according to claim 7, further comprising:

prior to the determining of the suitable receive BF weight matrix, selecting a candidate transmit BF weight vector from among a plurality of transmit BF weight vector candidates;

transmitting, from the NT transmission antennas, a reference signal subjected to analog transmit beamforming based on a candidate transmit BF weight matrix including the selected candidate transmit BF weight vector;

generating a receive BF output vector having a number NR of receive BF output components, by a number LR of receive beamforming circuits carrying out receive beamforming (NR/LR) times with respect to a received signal vector corresponding to the reference signal received by the number NR of the reception antennas;

calculating the sum of the reception power of the receive BF output vectors;

acquiring a plurality of the sums of reception power by executing the selection, transmission, generation and calculation on a plurality of the transmit BF weight vector candidates; and selecting the LT transmit BF weight vector candidates in decreasing order of the sum of reception power, and determining a suitable BF weight matrix including the selected LT transmit BF weight vector candidates.

9. The radio communication control method according to claim 8, further comprising:

transmitting, from the transmitter device, a reference signal subjected to analog transmit beamforming based on the suitable transmit BF weight matrix;

estimating an equivalent channel matrix indicating a result of the reference signal received by the receiver device being subjected to analog receive beamforming based on the suitable receive BF weight matrix; and determining a suitable precoding matrix and a suitable postcoding matrix based on the estimated equivalent channel matrix.

10. A radio communication system, comprising
a transmitter device provided with
a precoder configured to carry out precoding by using a precoding matrix,
a transmit beamformer configured to carry out transmit beamforming, in which variation in phase and amplitude corresponding to a transmit beamforming (BF) weight matrix is imparted to signals after precoding has been executed, and
a number NT of transmission antennas for transmitting the signals that have been subjected to the transmit beamforming, and
a receiver device provided with
a number NR of reception antennas for receiving signals that have been transmitted from the transmitter device and propagated through a space,
a receive beamformer configured to carry out receive beamforming, in which variation in phase and amplitude corresponding to a receive BF weight matrix is imparted to the signals received by the plurality of reception antennas, and
a postcoder configured to carry out, by using a postcoding matrix, postcoding on the signals that have been subjected to the analog receive beamforming, wherein,
the receive beamformer generates a receive BF output vector having a number NR of receive BF output components, by a number LR of receive beamforming circuits provided in the receive beamformer carrying out receive beamforming (NR/LR) times with respect to a received signal vector received by the number NR of the reception antennas, and
the receiver device is further provided with a calculation processor configured to
calculate reception power for each of the NR receive BF output components, and
select the LR receive BF output components in decreasing order of reception power, and determine a suitable receive BF weight matrix including LR reception orthogonal BF weight vectors corresponding to the selected receive BF output components.

11. A radio communication system, comprising
a transmitter device provided with
a precoder configured to carry out precoding by using a precoding matrix,
a transmit beamformer configured to carry out transmit beamforming, in which variation in phase and amplitude corresponding to a transmit BF weight matrix is imparted to signals after precoding has been executed, and
a number NT of transmission antennas for transmitting the signals that have been subjected to the transmit beamforming, and
a receiver device provided with
a number NR of reception antennas for receiving signals that have been transmitted from the transmitter device and propagated through a space,
a receive beamformer configured to carry out receive beamforming, in which variation in phase and amplitude corresponding to a receive BF weight matrix is imparted to the signals received by the plurality of reception antennas, and
a postcoder configured to carry out, by using a postcoding matrix, postcoding on the signals that have been subjected to the analog receive beamforming, wherein,
the receive beamformer generates a receive BF output vector having a number NR of receive BF output components, by a number LR of receive beamforming circuits provided in the receive beamformer carrying out receive beamforming (NR/LR) times with respect to a received signal vector received by the number NR of the reception antennas,
the receiver device is further provided with a calculation processor configured to
acquire the received signal vector by multiplying each of a number NR of separation operators corresponding to the NR reception antennas with respect to the receive BF output vector,
estimate a channel matrix using the received signal vector,
calculate reception power for each of a plurality of receive BF weight vector candidates using the estimated channel matrix, and
select the LR receive BF weight vector candidates in decreasing order of reception power, and determine a suitable receive BF weight matrix including the selected LR receive BF weight vector candidates.

12. A radio communication system, comprising
a transmitter device provided with
a precoder configured to carry out precoding by using a precoding matrix,
a transmit beamformer configured to carry out transmit beamforming, in which variation in phase and amplitude corresponding to a transmit BF weight matrix is imparted to signals after precoding has been executed, and
a number NT of transmission antennas for transmitting the signals that have been subjected to the transmit beamforming, and
a receiver device provided with
a number NR of reception antennas for receiving signals that have been transmitted from the transmitter device and propagated through a space,
a receive beamformer configured to carry out receive beamforming, in which variation in phase and amplitude corresponding to a receive BF weight matrix is imparted to the signals received by the plurality of reception antennas, and
a postcoder configured to carry out, by using a postcoding matrix, postcoding on the signals that have been subjected to the analog receive beamforming, wherein,
each of a number LR of receive beamforming circuits provided in the receive beamformer carries out a bypass receiving operation that selects and acquires one of the received signal vector elements (NR/LR) times with respect to a received signal vector received by the number NR of the reception antennas, to acquire the received signal vector,
the receiver device is further provided with a calculation processor configured to
estimate a channel matrix using the received signal vector,
calculate reception power for each of a plurality of receive BF weight vector candidates using the estimated channel matrix, and
select the LR receive BF weight vector candidates in decreasing order of reception power, and determine a suitable receive BF weight matrix including the selected LR receive BF weight vector candidates.

* * * * *